(12) United States Patent
Iwakabe et al.

(10) Patent No.: US 7,538,829 B2  
(45) Date of Patent: May 26, 2009

(54) ACTIVE MATRIX TYPE LIQUID CRYSTAL DISPLAY AND LIQUID CRYSTAL MATERIAL

(75) Inventors: Yasushi Iwakabe, Ohamishirasato (JP); Masuyuki Ohta, Mattou (JP); Shigeru Matsuyama, Mobara (JP); Hitoshi Oaku, Hitachi (JP); Katsumi Kondo, Mido (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 11/585,176

(22) Filed: Oct. 24, 2006

(65) Prior Publication Data

US 2007/0035686 A1 Feb. 15, 2007

Related U.S. Application Data

(60) Division of application No. 10/637,555, filed on Aug. 11, 2003, now Pat. No. 7,256,843, which is a continuation of application No. 09/866,733, filed on May 30, 2001, now Pat. No. 6,645,576.

(30) Foreign Application Priority Data

Jun. 9, 2000 (JP) .............................. 2000-173986

(51) Int. Cl.  
*G02F 1/136* (2006.01)

(52) U.S. Cl. ............................ 349/43; 349/42; 349/141  
(58) Field of Classification Search .................. 349/43, 349/141  
See application file for complete search history.

(56) References Cited

U.S. PATENT DOCUMENTS

| | | | |
|---|---|---|---|
| 5,414,490 A | 5/1995 | Kurokawa et al. | |
| 5,535,028 A | 7/1996 | Bae et al. | |
| 5,929,958 A | 7/1999 | Ohta et al. | |
| 6,005,650 A | 12/1999 | Kim et al. | |
| 6,172,720 B1 | 1/2001 | Khan et al. | |
| 6,339,456 B1 * | 1/2002 | Nagano | 349/42 |
| 6,366,330 B1 | 4/2002 | Khan et al. | |

* cited by examiner

*Primary Examiner*—Richard H Kim  
(74) *Attorney, Agent, or Firm*—Reed Smith LLP; Juan Carlos A. Marquez, Esq.

(57) ABSTRACT

An active matrix liquid crystal display device is provided, in which an after image remaining after removing an application of a direct current voltage is suppressed. The active matrix liquid crystal display device has a liquid crystal layer containing a liquid crystal molecule having negative dielectric anisotropy and a dopant having a dissociative group.

13 Claims, 20 Drawing Sheets

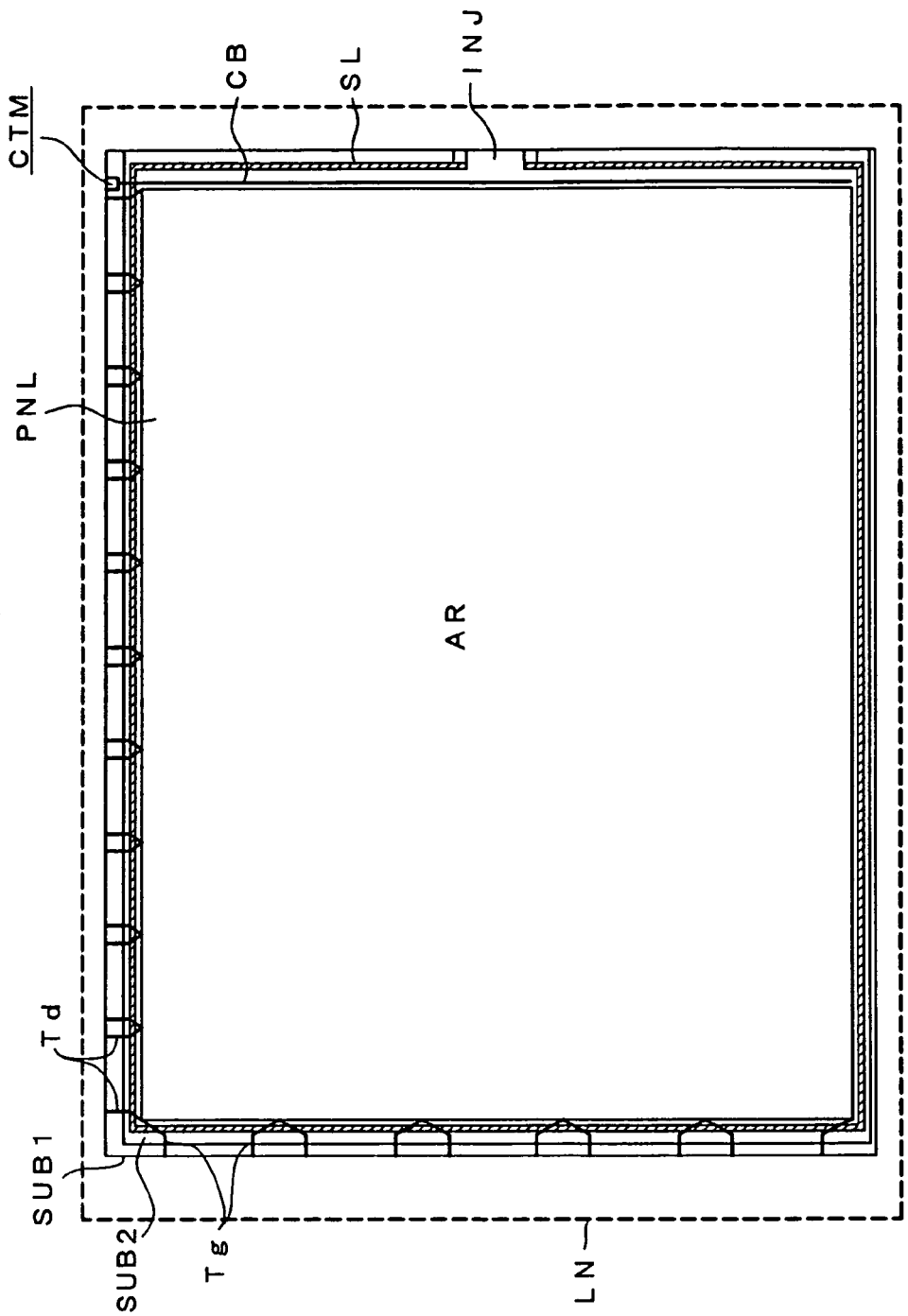

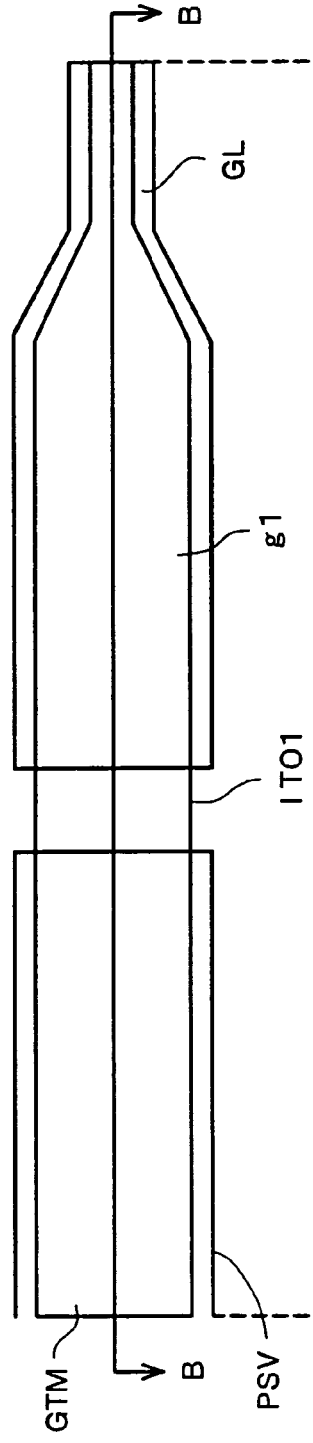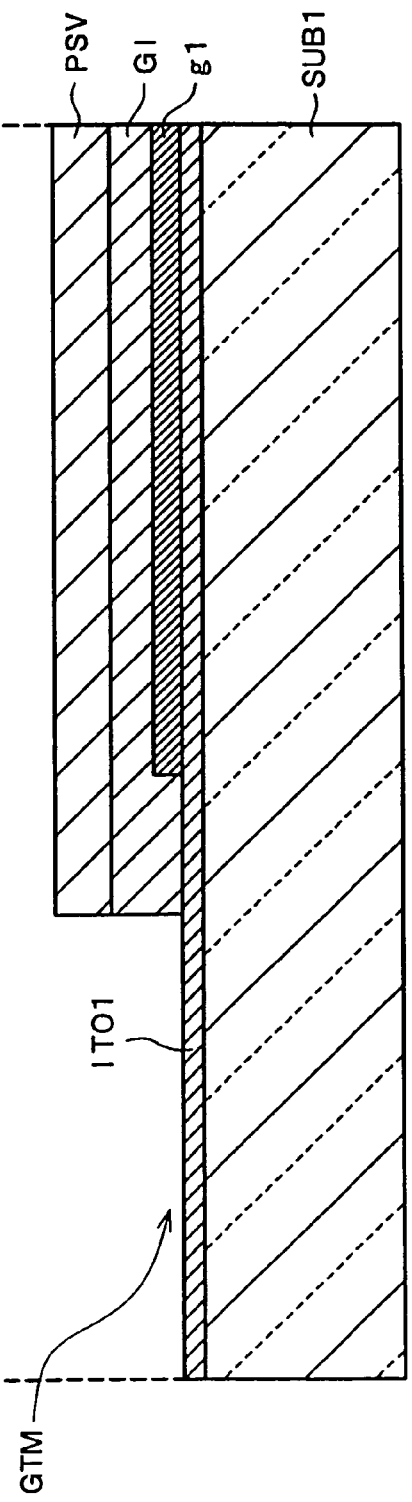
FIG. 8A
FIG. 8B

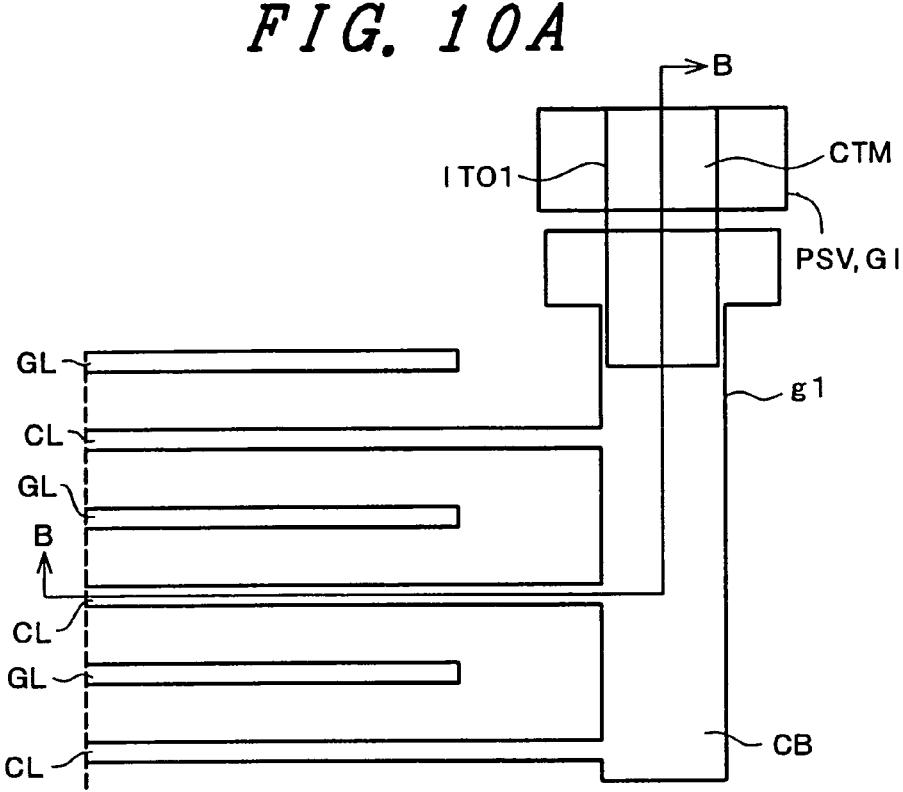
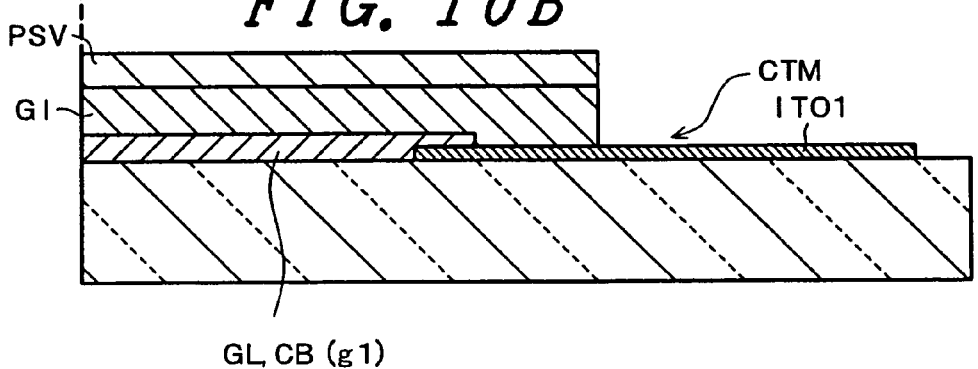

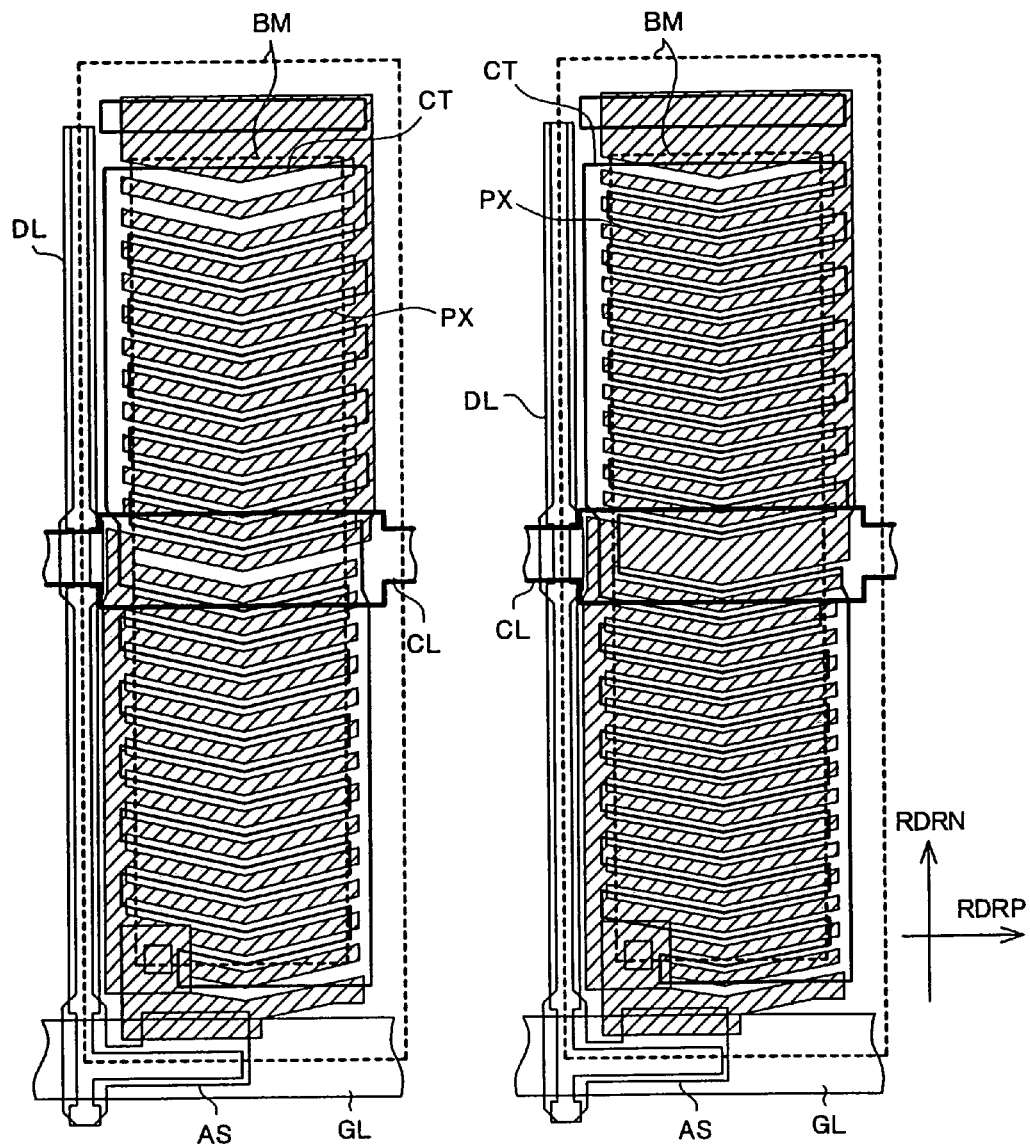

ACTIVE MATRIX TYPE LIQUID CRYSTAL DISPLAY AND LIQUID CRYSTAL MATERIAL

BACKGROUND OF THE INVENTION

This application is a Divisional application of U.S. application Ser. No. 10/637,555 filed on Aug. 11, 2003, now U.S. Pat. No. 7,256,843 which is a Continuation application of U.S. application Ser. No. 09/866,733 filed on May 30, 2001 now U.S. Pat. No. 6,645,576. Priority is claimed based on U.S. application Ser. No. 10/637,555 filed on Aug. 11, 2003, which claims priority to U.S. application Ser. No. 09/866,733 filed on May 30, 2001, all of which is incorporated by reference.

BACKGROUND OF THE INVENTION

1. Field of the Invention

The present invention relates to a liquid crystal display device, and more particularly, it relates to an active matrix liquid crystal display device of a so-called in-plane switching type.

2. Description of the Related Art

A liquid crystal display realizes display in such a manner that an electric field is applied to liquid crystal molecules in a liquid crystal layer sandwiched by a pair of substrates to change the orientation direction of the liquid crystal, so as to cause optical change of the liquid crystal layer.

The conventional active matrix liquid crystal display device is represented by a twisted nematic (TN) display system, in which the direction of the application of the electric field to the liquid crystal is set in the direction perpendicular to the substrate plane that sandwiches the liquid crystal, and the display is realized by utilizing the optical rotation of the liquid crystal layer.

On the other hand, a liquid crystal display device of a in-plane switching (IPS) system has been proposed in JP-B-63-21907, U.S. Pat. No. 4,345,249, WO 91/10936 and JP-A-6-160878, in which a comb electrode is used, and the direction of the electric field applied to the liquid crystal is set in the direction parallel to the substrate plane, whereby the display is realized by utilizing the birefringence of the liquid crystal.

The in-plane switching system has advantages, such as a wide viewing angle and a low load capacitance, in comparison to the conventional TN system, and is being rapidly developed in recent years as a new active matrix liquid crystal display device that superseding the TN system.

In the IPS system, the in-plane switching can be more perfectly realized in the case where the liquid crystal has negative dielectric anisotropy in comparison to the case of a liquid crystal having positive dielectric anisotropy, as demonstrated in J. of Appl. Phys., vol. 82, No. 4, pp. 528-535 (1997) by M. Oh-e, M. Yoneya and K. Kondo. The liquid crystal having negative dielectric anisotropy has a dielectric constant in the short axis direction of the liquid crystal molecule that is larger than the dielectric constant in the long axis direction perpendicular thereto, and the liquid crystal having positive dielectric anisotropy has a dielectric constant in the short axis direction of the liquid crystal molecule that is smaller than the dielectric constant in the long axis direction perpendicular thereto.

The perfect realization of the in-plane switching completes enhancement of the viewing angle of the liquid crystal display device including halftone. Therefore, the liquid crystal having negative dielectric anisotropy is preferred as a liquid crystal used in the IPS system from the foregoing standpoint.

The IPS system employs an opaque metallic comb electrode in a stripe form provided on an inner surface of one of the pair of electrodes.

In recent years, a modified system of the IPS system has been proposed in that the comb electrode is formed with a transparent electroconductive substance, such as ITO (indium tin oxide), instead of the opaque metallic electrode, and is arranged at a shorter interval than the conventional IPS system, and a liquid crystal material having negative dielectric anisotropy, whereby the entire liquid crystal present above the transparent comb electrode can be subjected to orientation change only with an electric field formed at the periphery of the comb electrode, so as to improve the transmittance and the opening ratio.

Literatures relating to the foregoing proposal include Asia Display 1998, pp. 371-374, by S. H. Lee, S. L. Lee and H. Y. Kim and SID digest 1999, pp. 202-205, by S. H. Lee, H. Y. Kim and T. Y. Eom.

SUMMARY OF THE INVENTION

The foregoing literatures report that in the IPS system combining the liquid crystal material having negative dielectric anisotropy and the short interval transparent comb electrode, such transmittance that is close to the TN system can be realized with maintaining such wide viewing angle characteristics that is equivalent to the IPS system.

It has been known in a liquid crystal display device that in the case where a liquid crystal driving voltage waveform having a direct current voltage superposed is applied to a liquid crystal layer, the direct current voltage (direct current offset voltage) remains in the liquid crystal layer even when the direct current voltage is removed.

As discussed in S. Matsumoto, Ekishou Display Gijutu (Liquid Crystal Display Technique), published by Sangyo Tosho Co., Ltd., Chap. 2, pp. 70-73, the application of the driving voltage waveform having a direct current voltage superposed to the liquid crystal layer may occur in an active matrix liquid crystal display device in an ordinary liquid crystal operation due to the structure of the active driving element of the liquid crystal display device, and it is difficult to completely prevent the superposing phenomenon of a direct current voltage when gradation display is conducted. The phenomenon is common to both the TN system and the IPS system conventionally employed.

The remaining direct current voltage affects the brightness in liquid crystal display devices of both the TN system and the IPS system, and difference in brightness is caused between a part applied with the direct current voltage and a part not applied therewith or between parts having different intensities of the applied direct current voltage.

Therefore, in the case, for example, where texts or graphics are displayed under ordinary driving conditions for a long period of time, such a phenomenon occurs that the texts or graphics that have been displayed are displayed for a certain period after turning off the display.

As a result, uniformity of display is impaired. Such a phenomenon is called as an after image of a liquid crystal display device, which is gradually decreased in intensity with the lapse of time after formation thereof and is finally disappeared, but there are cases where a period of 30 minutes or more is required to disappear upon viewing with the naked eye.

As a mechanism that when a direct current voltage is applied, the direct current offset voltage remains in a liquid crystal layer, a model explaining by behavior of ions in the liquid crystal layer in the conventional TN system as an example has been proposed in Shingaku Gihou (Technical Research Report of Institute of Electronics, Information and Communication Engineers), EID96-89, pp. 29-34 (1997-01).

According to the model, a direct current voltage charged in an oriented film and absorption of ions on an orientation film for directing the liquid crystal are considered as factors of the direct current voltage remaining in the liquid crystal layer, and it sums up that the remanence of the direct current voltage for several minutes is caused by charging and relaxation of the orientation film, and the remanence of the direct current voltage for a longer period is caused by absorption of ions on the orientation film.

The IPS system suffers more frequent occurrence of the after image than the TN system. In the TN system, only liquid crystal orientation controlling layers and a liquid crystal layer are present between a pixel electrode and a counter electrode, and an electric field is applied to the pixel electrode, the liquid crystal orientation controlling layer, the liquid crystal layer, the liquid crystal orientation controlling layer and the counter electrode in this order.

On the other hand, the IPS system has an insulating layer in addition to the liquid crystal layer and the liquid crystal orientation controlling layers between the pixel electrode and the counter electrode, and the electric field is applied to the pixel electrode, the liquid crystal orientation controlling layer, the liquid crystal layer, the liquid crystal orientation controlling layer, the insulating layer and the counter electrode in this order.

That is, because charging and relaxation of the orientation films and the insulating film are considered while only the orientation film is considered for the remanence of the direct current voltage in the TN system, the after image is liable to occur in the IPS system as compared to the TN system.

In TN system, the after image is liable to occur when an insulating layer is arranged on the pixel electrode or the counter electrode to sandwich the insulating layer between pixel electrode and the counter electrode, to which the electric field is applied.

However, the occurrence of the after image can be suppressed by opening holes on the insulating film at positions above the pixel electrode and the counter electrode, so as to apply the electric field on the pixel electrode, the liquid crystal orientation controlling layer, the liquid crystal layer, the liquid crystal orientation controlling layer and the counter electrode in this order.

JP-A-7-159786 proposes a method for suppressing the remanence phenomenon of the direct current voltage caused by charging and relaxation of the orientation film by optimizing the dielectric constant and the specific resistance of the orientation film and the liquid crystal. In order to suppress the after image by accelerating the charging and relaxation of the orientation film and the insulating film, it is effective that the liquid crystal has a lower specific resistance.

The specific resistance of the liquid crystal can be decreased by adding a substance that decreases the specific resistance of the liquid crystal. For example, JP-A-11-302652 proposes that the specific resistance of a liquid crystal can be adjusted by adding an oxidative compound to the liquid crystal.

The after image causes no problem when a liquid crystal containing the oxidative compound is used in the IPS system using a liquid crystal material having positive dielectric anisotropy and the IPS system combining a liquid crystal material having positive dielectric anisotropy and a short interval transparent comb electrode.

However, the occurrence of the after image cannot be completely avoided by using the oxidative compound in the IPS system using a liquid crystal material having negative dielectric anisotropy and the IPS system combining a liquid crystal material having negative dielectric anisotropy and a short interval transparent comb electrode.

The oxidative compound has a molecular structure that is similar to the liquid crystal material having positive dielectric anisotropy. That is, one of the both ends in the long axis of the molecule is formed with a group having polarity other than a group having no polarity or extremely weak polarity, such as an alkyl group or an alkoxy group.

The other of the ends is formed with a group having high polarity, such as a cyano group or a fluorine-containing group, and it is polarized in the longer axis of the molecule rather than the shorter axis of the molecule.

The liquid crystal molecule having positive dielectric anisotropy is also polarized in the longer axis of the molecule rather than the shorter axis of the molecule. In other words, the liquid crystal material having positive dielectric anisotropy and the oxidative compound agree to each other in the molecular axis direction and the polarizing direction. It is therefore considered that the remaining direct current voltage can be effectively relaxed.

However, in the case of the liquid crystal material having negative dielectric anisotropy, the both ends in the longer axis direction of the molecule are formed with a group having no polarity or extremely weak polarity, such as an alkyl group or an alkoxy group, and one end in the shorter axis of the molecule is formed with a group having high polarity, such as a cyano group and a fluorine-containing group. Therefore, it is polarized in the shorter axis of the molecule rather than the longer axis of the molecule.

As described in the foregoing, the liquid crystal material having negative dielectric anisotropy does not agree to the oxidative compound, which has a molecular structure that is similar to the liquid crystal material having positive dielectric anisotropy, in the molecular axis direction and the polarizing direction. Therefore, it is considered that the remaining direct current voltage cannot be effectively relaxed.

The invention has been developed to solve the foregoing problems associated with the conventional art.

An object of the invention is to provide an active matrix liquid crystal display device of an IPS system that is difficult to cause a state of ununiform display remaining after application of a direct current voltage, i.e., an after image, in an IPS system using a liquid crystal material having negative dielectric anisotropy and an IPS system combining a liquid crystal material having negative dielectric anisotropy and a short interval transparent comb electrode.

Another object of the invention is to provide an active matrix liquid crystal display device of an IPS system that is difficult to cause an after image by adding a dissociative dopant and modifying the shape of the electrode even in the case where a liquid crystal material having positive dielectric anisotropy.

In order to accomplish the objects, the invention relates to an active matrix liquid crystal display device comprising
a pair of substrates;
a liquid crystal layer sandwiched by said pair of substrates;
orientation films defining an orientation direction of a liquid crystal molecule of said liquid crystal layer, said orientation films being arranged between said pair of substrates and said liquid crystal layer; and
a pixel electrode and a counter electrode applying a voltage to said liquid crystal layer,
said liquid crystal molecule of said liquid crystal layer having negative dielectric anisotropy, and said liquid crystal layer containing a dopant having a dissociative group.

A liquid crystal display device causing less after image can be provided.

In order to accomplish the objects, the invention relates to an active matrix liquid crystal display device comprising a pair of substrates, at least one of which is transparent; liquid crystal orientation controlling layers formed on surfaces of the pair of substrates facing each other; a liquid crystal layer comprising a liquid crystal composition having negative dielectric anisotropy arranged between the pair of substrate to make in contact with the liquid crystal orientation controlling layers (orientation films); a pixel electrode and a counter electrode formed on one of the pair of substrates through an insulating film; and an active element connected to the pixel electrode and the counter electrode, the liquid crystal layer containing a dopant having a dissociative group only in a shorter axis direction of the molecule and having an alkyl group or an alkoxy group on both ends of a molecular axis direction.

According to the liquid crystal display device, the liquid crystal material having negative dielectric anisotropy and the dopant having a dissociative group only in a shorter axis direction of the molecule agree to each other in the molecular axis direction and the polarizing direction.

Therefore, the remaining direct current voltage can be effectively relaxed, and a liquid crystal display device causing less after image can be provided.

The dopant having a dissociative group referred herein means an acidic dissociative substance or a basic dissociative substance, or in other words, a substance generating an $H^+$ ion through dissociation by itself in a polar solvent or generating an $OH^-$ ion through a reaction with water.

Specific examples thereof include a carboxylic acid (including an anhydride thereof), an amide, an amine and an alcohol. When these substances are added to a liquid crystal, the ion concentration in the liquid crystal is increased, so as to decrease the specific resistance.

It is preferred that the pixel electrode and the counter electrode are transparent electrode formed with a transparent electrode, such as ITO, and electric insulation between the pixel electrode and the counter electrode is maintained by a transparent insulating film. For example, the pixel electrode may be a short interval transparent comb electrode, and the counter electrode may be a solid electrode. The transparent insulating film may be constituted, for example, with IZO, silicon nitride, titanium oxide, silicon oxide and a mixture thereof.

When the dopant has the following structure represented by the general formula (I), it can effectively relax the remaining direct current voltage, so as to provide a liquid crystal display device exhibiting less after image. The dopant having the following structure has a molecular structure that is similar to a liquid crystal material having negative dielectric anisotropy.

That is, both ends in the longer axis direction of the molecule are formed with a group having polarity other than a group having no polarity or extremely weak polarity, such as an alkyl group or an alkoxy group.

Since it has a dissociative group in the shorter axis direction of the molecule, it is strongly polarized in the shorter axis direction of the molecule.

The liquid crystal molecule having negative dielectric anisotropy is also polarized in the shorter axis direction of the molecule rather than the longer axis direction of the molecule.

The liquid crystal material having negative dielectric anisotropy and the dopant having the following structure agree to each other in the molecular axis and the polarizing direction.

Accordingly, the remaining direct current voltage can be effectively relaxed. 1 wherein $Y_1$ represents any one of —COOH, —CONH$_2$, —NH$_2$, —OH, —NHR or —NR$_2$; $Y_2$ represents anyone of hydrogen, —F, —CN, —COOH, —CONH, —NH$_2$ or —OH; $Y_3$ represents any one of hydrogen, —F, —CN, —COOH, —CONH, —NH$_2$ or —OH; $Y_4$ represents any one of hydrogen, —F, —CN, —COOH, —CONH, —NH$_2$ or —OH; $X_1$ represents any one of a single bond, —CO—O—, —O—CO—, —COCH$_2$—, —CH$_2$—CO—, —CH$_2$O—, —OCH$_2$—, —CH$_2$—CH$_2$— or —CH=CH—; $X_2$ represents any one of a single bond, —CO—O—, —O—CO—, —COCH$_2$—, —CH$_2$—CO—, —CH$_2$O—, —OCH$_2$—, —CH$_2$—CH$_2$— or —CH=CH—; $A_1$ represents any one of a single bond, a phenylene group or a cyclohexylene group; $A_2$ represents any one of a single bond, a phenylene group or a cyclohexylene group; $R_1$ represents any one of an alkyl group or an alkoxy group; and $R_2$ represents any one of an alkyl group or an alkoxy group.

Furthermore, when the dopant has the following structure represented by the general formula (II), it can more effectively relax the remaining direct current voltage, so as to provide a liquid crystal display device exhibiting less after image. The dopant having the following structure has a molecular structure that is further similar to a liquid crystal material having negative dielectric anisotropy. That is, both ends in the longer axis direction of the molecule are formed with a group having polarity other than a group having no polarity or extremely weak polarity, such as an alkyl group or an alkoxy group.

In this application, single bond means direct connection. In case X1 is single bond, for example, A1 connect directly to benzene structure.

Since it has a highly dissociative group or a group having high polarity at one end of the shorter axis direction of the molecule, it is strongly polarized in the shorter axis direction of the molecule. Since the liquid crystal material having negative dielectric anisotropy has a group having high polarity, such as a cyano group or a fluorine-containing group, at one end of the shorter axis direction of the molecule, it is polarized in the shorter axis direction of the molecule rather than the longer axis direction of the molecule.

The liquid crystal material having negative dielectric anisotropy and the dopant having the following structure agree to each other in the molecular axis and the polarizing direction. Accordingly, the remaining direct current voltage can be effectively relaxed. 2 wherein $Y_1$ represents any one of —COOH, —CONH$_2$, —NH$_2$, —OH, —NHR or —NR$_2$; $Y_2$ represents any one of hydrogen, —F, —CN, —COOH, —CONH, —NH$_2$ or —OH; $X_1$ represents any one of a single bond, —CO—O—, —O—CO—, —COCH$_2$—, —CH$_2$—CO—, —CH$_2$O—, —OCH$_2$—, —CH$_2$—CH$_2$— or —CH=CH—; $X_2$ represents any one of a single bond, —CO—O—, —O—CO—, —COCH$_2$—, —CH$_2$—CO—, —CH$_2$O—, —OCH$_2$—, —CH$_2$—CH$_2$— or —CH=CH—; $A_1$ represents any one of a single bond, a phenylene group or a cyclohexylene group; $A_2$ represents any one of a single bond, a phenylene group or a cyclohexylene group; $R_1$ represents any one of an alkyl group or an alkoxy group; and $R_2$ represents any one of an alkyl group or an alkoxy group.

The content of the dopant in the liquid crystal is generally 100 ppm ($1 \times 10^{-4}$% by weight) or more, and preferably 1,000 ppm or more. When a non-liquid crystal substance is incorporated in a liquid crystal, the characteristics of the liquid crystal (liquid crystal property) is deteriorated, and when a too large amount of the non-liquid crystal substance is incorporated, such a temperature range in that the liquid crystal behaves as a liquid crystal nature becomes narrow. In the invention, since the dopant is incorporated in the liquid crystal in an amount of 100 ppm or more, preferably 1,000 ppm or more, the after image can be suppressed while decrease of the liquid crystal property of the liquid crystal is suppressed to the allowable range to constitute an active matrix liquid crystal display device, whereby a liquid crystal. display device having excellent liquid crystal characteristics and less after image can be provided.

When the specific resistance of the liquid crystal is from $1.0 \times 10^9$ to $1.0 \times 10^{12}$ Ω·cm, a liquid crystal display device having less after image can be provided. When the liquid crystal has a specific resistance of more than $1.0 \times 10^{12}$ Ω·cm, the effect of suppressing the after image cannot be conspicuously obtained, and when the liquid crystal has a specific resistance of less than $1.0 \times 10^9$ Ω·cm, high display quality cannot be maintained.

The orientation film as the liquid crystal orientation controlling layer is formed to have a film thickness of from 20 nm to 300 nm. When the film thickness of the orientation film is less than 20 nm, the uniformity of the orientation film is deteriorated since the unevenness of the surface of the ITO film or the IZO film, which is formed under the orientation film, is from 10 nm to 20 nm, so as to cause display unevenness and to cause printing unevenness of the orientation film upon forming the orientation film. When the film thickness of the orientation film is more than 300 nm, the orientation film is ununiformly dried, which causes display unevenness.

The insulating film is formed to have a film thickness of from 0.1 μm to 4 μ. When the film thickness of the insulating film is less than 0.1 μ, the insulating property of the film is deteriorated, and when it exceeds 4 μ, the after image becomes conspicuous.

As the liquid crystal having negative dielectric anisotropy, a liquid crystal containing a liquid crystal molecule having a difluorinated benzene structure in the molecule and a liquid crystal containing a liquid crystal molecule having a dicyanobenzene structure in the molecule can be used.

Furthermore, a liquid crystal containing both a liquid crystal molecule having a difluorinated benzene structure in the molecule and a liquid crystal molecule having a dicyanobenzene structure in the molecule can also be used. A liquid crystal containing a liquid crystal molecule having a monocyanocyclohexane structure in the molecule can also be used as the liquid crystal having negative dielectric anisotropy.

A liquid crystal containing both a liquid crystal molecule having a difluorinated benzene structure in the molecule and a liquid crystal molecule having a monocyanocyclohexane structure in the molecule can also be used.

Moreover, in the case of a liquid crystal having positive dielectric anisotropy is used, the dissociative dopant can be added, and the structures of the pixel electrode and the counter electrode are normalized, whereby the occurrence of the after image can be suppressed.

One means is an active matrix liquid crystal display device comprising a pair of substrates; a liquid crystal layer sandwiched by said pair of substrates; orientation films defining an orientation direction of a liquid crystal molecule of said liquid crystal layer, said orientation films being arranged between said pair of substrates and said liquid crystal layer; and a pixel electrode and a counter electrode applying a voltage to said liquid crystal layer, said liquid crystal molecule of said liquid crystal layer having positive dielectric anisotropy, and said liquid crystal layer containing a dopant having a dissociative group.

A means with a liquid crystal composition comprising from 100 ppm to 1,000 ppm of a dopant having a dissociative group only in a shorter axis direction of a molecule and having an alkyl group or an alkoxy group on both ends of said shorter axis direction of a molecule is effective.

BRIEF DESCRIPTION OF THE DRAWINGS

FIG. 6 is a plane view showing a structure of a matrix periphery of a display panel.

FIGS. 8A and 8B are a plane view and a cross sectional view, respectively, of an example of a structure in the vicinity of a connecting part of a gate terminal GTM and a gate line GL.

FIGS. 10A and 10B are a plane view and a cross sectional view, respectively, of an example of a structure in the vicinity of a connecting part of a counter electrode terminal CTM and a common bas line CB with a common voltage signal line CL.

FIGS. 19A and 19B are plane views showing one pixel of further examples of a liquid crystal display part of an active matrix color liquid crystal display device.

DETAILED DESCRIPTION OF THE PREFERRED EMBODIMENTS

Figure 1:
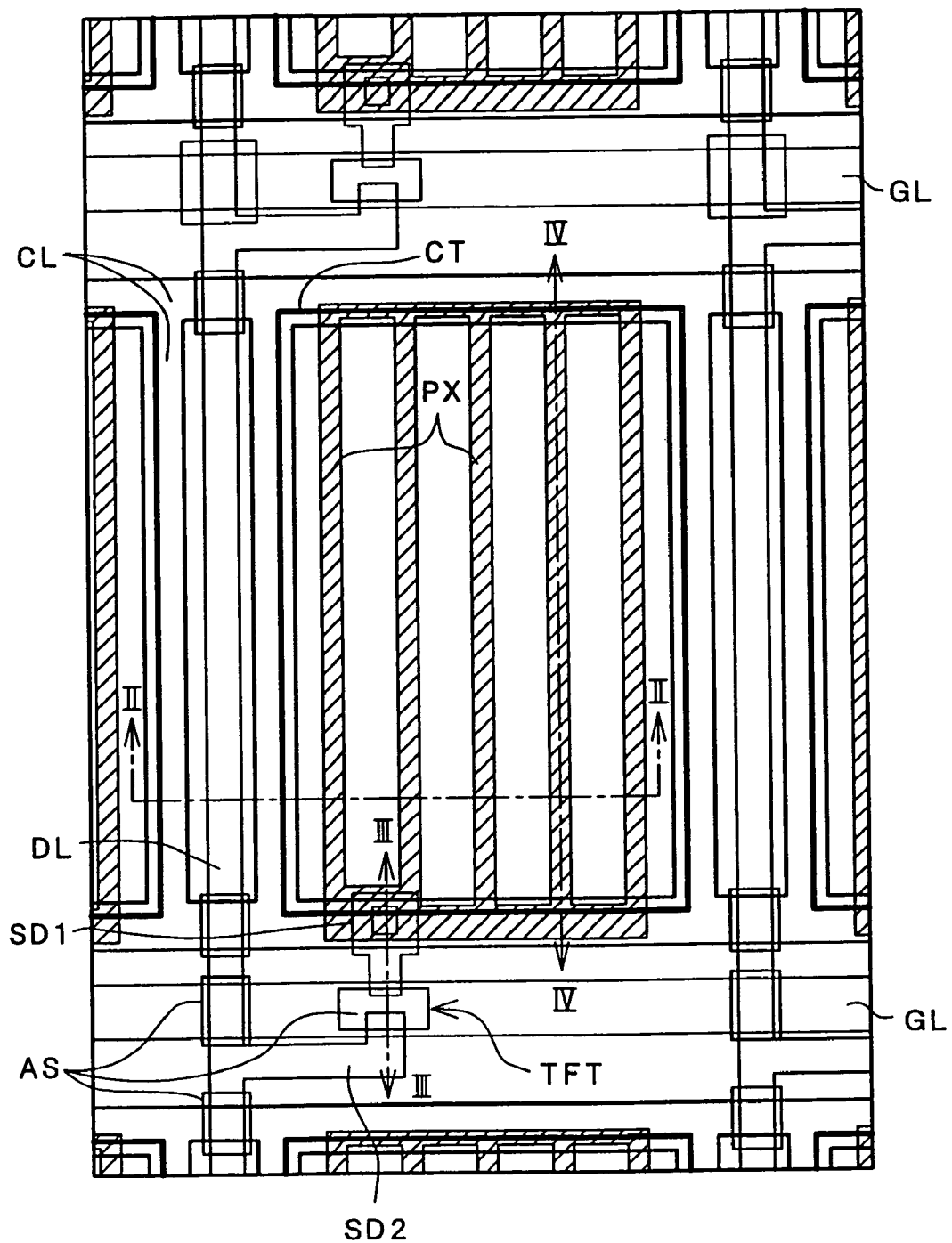
FIG. 1 is a plane view showing a constitutional example of one pixel and a periphery thereof of a liquid crystal display part of an active matrix color liquid display device.

Embodiments of the invention will be described below with reference to the drawings. An example of an active matrix color liquid crystal display device, to which the invention is applied, will be described. In the drawings, the same symbols are attached to the parts having the same functions to omit the repetition of explanation.

CL EXAMPLE 1

Plane Structure of Matrix Part (Pixel Part)

FIG. 1 is a plane view showing one pixel and a periphery thereof of an active matrix color liquid display device according to the invention. The following description refers to a so-called thin film transistor liquid crystal display device using a thin film transistor (TFT) as an active matrix element.

As shown in FIG. 1, the pixel is arranged in the region surrounded by a gate signal line (a scanning signal line or a horizontal signal line) GL, a common voltage signal line (a counter electrode line) CL and adjacent two drain signal lines (image signal lines or vertical signal lines) DL crossing each other.

These signal lines each is formed with an opaque metallic electrode. The gate signal line GL and the common voltage signal line CL are lied horizontally in FIG. 1, and pluralities thereof are arranged vertically. The image signal line DL is laid vertically, and a plurality thereof is arranged horizontally.

The pixel electrode PX is formed with an ITO transparent electroconductive film and is electrically connected with (a source electrode SD1 of) the thin film transistor TFT via a through hole. The counter electrode CT is also formed with ITO and is electrically connected with the common voltage signal line CL. The symbol SD2 denotes a drain electrode and AS denotes a semiconductor layer.

The pixel electrode PX is formed to has a comb form, each of which is a long electrode extending in the vertical direction in FIG. 1. The counter electrode CT is a solid transparent electrode, and the optical state of a liquid crystal composition LC is controlled by an electric field generated between the pixel electrode PX and the counter electrode CT.

The gate signal line GL is to transmit the gate signal to the thin film transistor TFT of the respective pixels, and the drain signal line DL is to supply the drain signal voltage to the pixel electrode PX of the respective pixels via (a drain electrode SD2 of) the thin film transistor TFT. The common voltage signal line CL is to supply the common voltage to the counter electrode CT of the respective pixels.

The common voltage signal line CL formed with a metallic electrode is formed to surround the sides of the drain signal line DL, and it also functions as a light shielding layer for preventing unnecessary light leakage on the sides of the drain line caused by influence of an electric field formed by the potential of the drain electrode.

The electrode width W and the electrode interval L of the pixel electrode PX of a comb form are changed depending on the liquid crystal material used. This is because since the intensity of the electric field that attains the maximum transmissibility varies depending on the liquid crystal material, the electrode interval is set depending on the liquid crystal material, so as to obtain the maximum transmissibility within the range of the maximum amplitude of the signal voltage determined by the withstanding voltage of the drain signal driving circuit (signal driver) used.

The width of the pixel electrode is set at a range of from 1 µ to 15 µ, and in this example, it is set at 4 µ taking the opening ratio and the productivity of the electrode into consideration. The electrode interval L is set at a range of from 1 µ to 10 µ, and in this example, it is set at 4 µ for realizing the driving voltage of 10 V or less.

Cross Sectional Structure of Matrix Part (Pixel Part)

Figure 2:
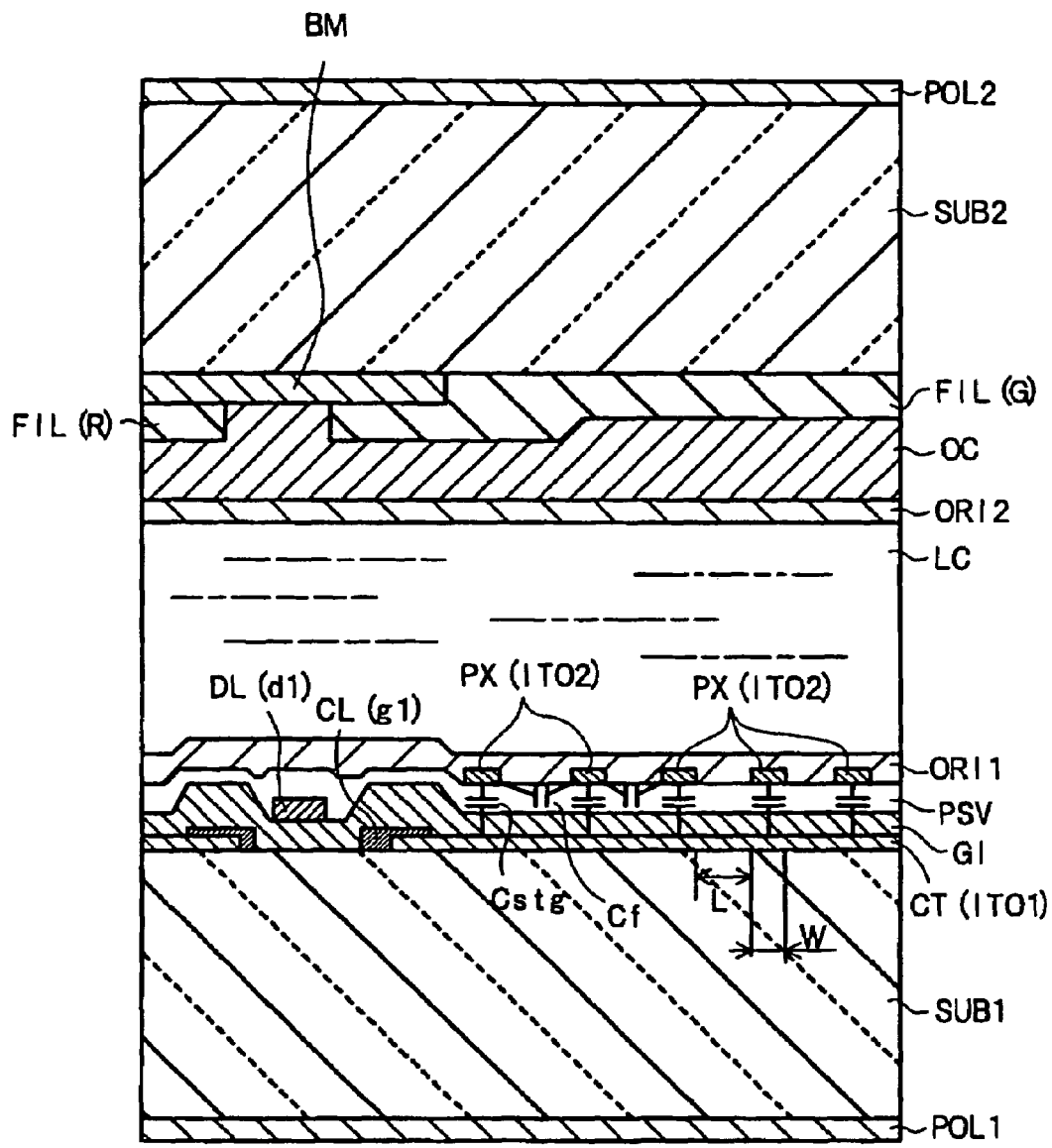
FIG. 2 is a cross sectional view on line II-II in FIG. 1.
Figure 3:
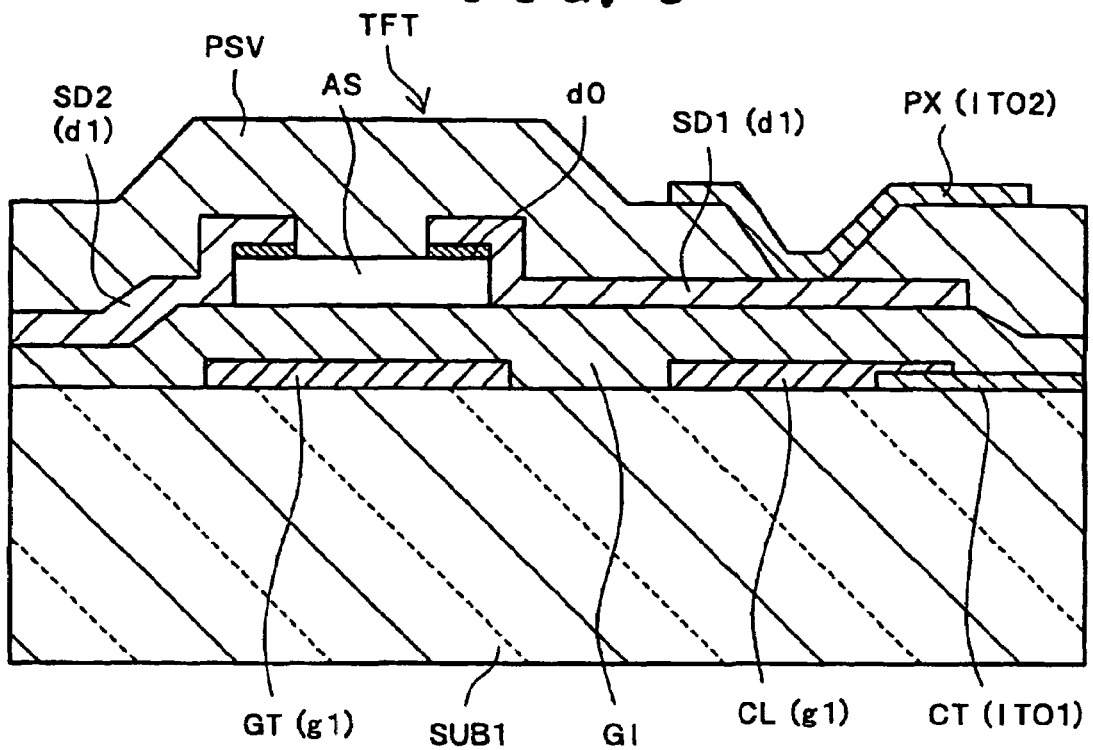
FIG. 3 is a cross sectional view of a thin film transistor (TFT) on line III-III in FIG. 1.
Figure 4:
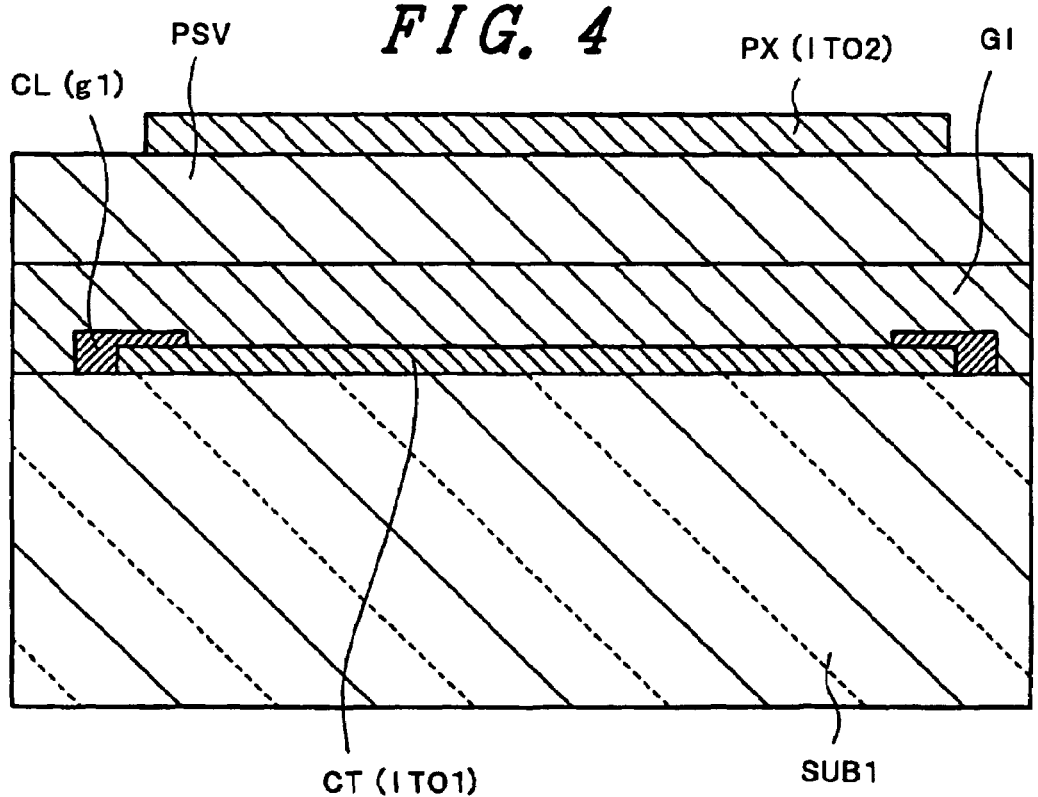
FIG. 4 is a cross sectional view of a storage capacitance (Cstg) forming part on line IV-IV in FIG. 1.

FIG. 2 is a cross sectional view on line II-II in FIG. 1, FIG. 3 is a cross sectional view of the thin film transistor TFT on line III-III in FIG. 1, and FIG. 4 is a cross sectional view of a storage capacitance (Cstg) forming part on line IV-IV in FIG. 1.

As shown in FIGS. 2 to 4, on a lower transparent glass substrate SUB1 arranged under the liquid crystal composition layer (hereinafter sometimes simply referred to as a liquid crystal) LC, the thin film transistor TFT, the storage capacitance Cstg and the electrode group are formed, and on a upper transparent glass electrode SUB2, a color filter FIL and a light shielding black matrix pattern BM are formed.

Orientation films ORI1 and ORI2, which are liquid crystal orientation controlling layers for controlling the initial orientation of the liquid crystal, are formed on the inner surfaces (on the side of the liquid crystal LC) of the transparent glass substrates SUB1 and SUB2. Polarizing plates POL1 and POL2 are provided on the outer surfaces of the transparent glass substrates SUB1 and SUB2.

This example has such a structure as shown in FIGS. 2 to 4 that the counter electrode CT as solid ITO and the gate signal line GL are in the same layer, and the pixel electrode PX as comb form ITO is formed on a protective insulating film PSV formed on the signal line DL.

Therefore, in the cross sectional view, the pixel electrode PX and the counter electrode CT are sandwiched by a gate insulating film GI and the protective insulating film PSV, which form the storage capacitance Cstg.

The common signal line CL is in contact with the counter electrode CT in the same layer. The gate insulating film GI and the protective insulating film PSV may be formed with $SiO_2$ or $Si_xN_y$.

Figure 20:
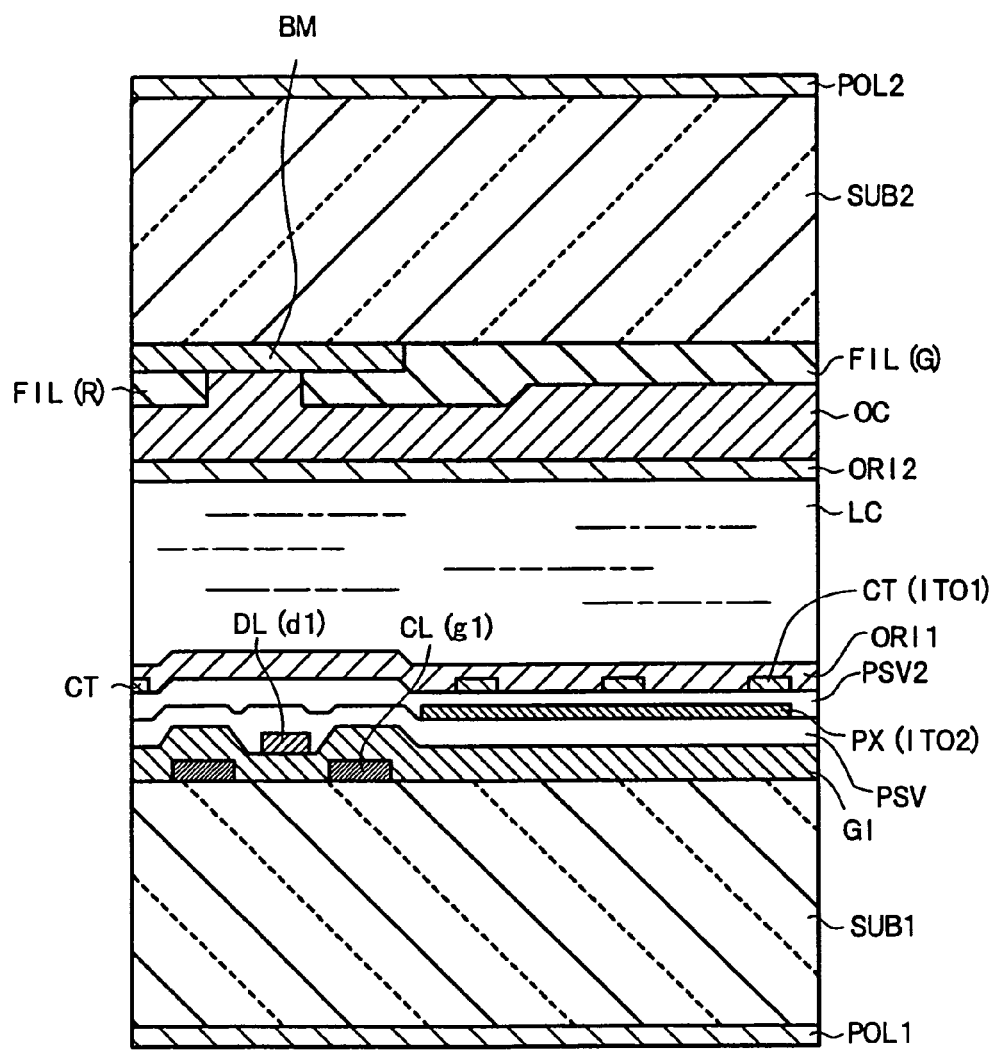
FIG. 20 is a cross sectional view showing one pixel of a further example of a liquid crystal display part of an active matrix color liquid crystal display device.
Figure 21:
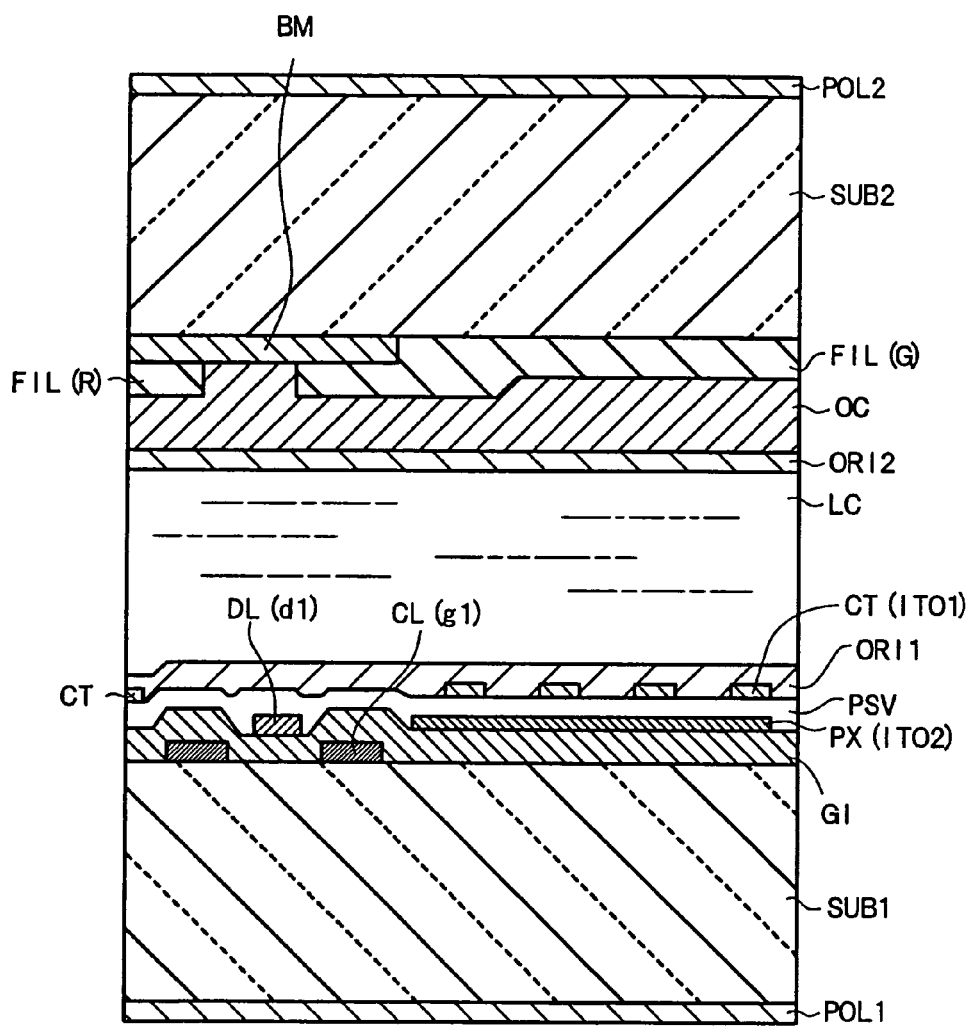
FIG. 21 is a cross sectional view showing one pixel of a further example of a liquid crystal display part of an active matrix color liquid crystal display device.

In addition to the structure of the pixel electrode and the counter electrode shown in FIG. 2, the following structures may be employed. As shown in FIG. 20, a pixel electrode PX is formed with solid ITO, and a counter electrode CT having a comb electrode part is arranged above the pixel electrode PX through a protective insulating film PSV2. As shown in FIG. 21, a pixel electrode is formed with solid ITO, and a counter electrode CT having a comb electrode part is arranged above the pixel electrode PX through a protective insulating film PSV1.

TFT Substrate

The structure of the lower transparent glass substrate SUB1 (a TFT substrate) will be described in detail below.

Thin Film Transistor TFT

FIG. 3 shows a cross sectional view of the part of the thin film transistor. The thin film transistor TFT function in such a manner that when a positive bias is applied to a gate electrode GT, the channel resistance between the source and the drain is decreased, and when the bias is zero, the channel resistance is increased.

The thin film transistor TFT has a gate electrode GT, a gate insulating film GI, an i type (intrinsic, i.e., doped with no impurity determining the conductive type) semiconductor layer AS comprising i type amorphous silicon (Si), and a pair of electrodes (a source electrode SD1 and a drain electrode SD2).

The source electrode SD1 and the drain electrode SD2 are fundamentally determined by the bias polarity between them, and the polarity is repeatedly inverted during operation of the circuit of the liquid crystal display device. Therefore, it is understood that the source electrode SD1 and the drain electrode SD2 are interchanged by each other during operation. However, in the following description, one of them is referred to as a source electrode and the other is referred to as a drain electrode for convenience.

Gate Electrode GT

The gate electrode GT is formed continuously from the gate signal line GL, and a part of the region of the gate signal line GL is formed as the gate electrode GT. The gate electrode GT is a region beyond the active region of the thin film transistor TFT.

In this example, the gate electrode GT is formed with a single layer electroconductive film g1. The electroconductive film g1 may be, for example, a chromium-molybdenum (Cr—Mo) alloy film formed by sputtering, but it is not limited thereto. The electroconductive film may have a two-layer structure of different metals.

Gate Signal Line GL

The gate signal line GL is formed with a single layer electroconductive film g1. The electroconductive film g1 of the gate signal line GL is formed in the same production process as the electroconductive film g1 of the gate electrode GT and is integrated therewith.

A gate voltage GV is supplied from an outer circuit to the gate electrode GT via the gate signal line GL. In this example, a chromium-molybdenum (Cr—Mo) alloy film formed by sputtering, for example, is used as the electroconductive film g1.

The material of the gate signal line GL and the gate electrode GT is not limited to a chromium-molybdenum alloy and may be, for example, a two-layer structure comprising aluminum or an aluminum alloy wrapped with a chromium-molybdenum alloy for decreasing the resistance.

Common Voltage Signal Line CL

The common voltage signal line CL is formed with an electroconductive film g1. The electroconductive film g1 of the common voltage signal line CL is formed in the same production process as the electroconductive film of the gate signal line GL and the gate electrode GT and is integrated with the counter electrode CT.

A common voltage Vcom is supplied from an outer circuit to the counter electrode CT via the common voltage signal line CL.

The material of the common voltage signal line CL is not limited to a chromium-molybdenum alloy and may be, for example, a two-layer structure comprising aluminum or an aluminum alloy wrapped with a chromium-molybdenum alloy for decreasing the resistance.

Insulating Film GI

The insulating film GI is used as a gate insulating film for applying an electric field to the semiconductor layer AS associated with the gate electrode GT in the thin film transistor TFT. The insulating film GI is formed as an upper layer of the gate electrode GT and the gate signal line GL.

As the insulating film GI, for example, a silicon nitride film formed by plasma CVD is selected, which is formed to have a thickness of from 100 nm to 4 µ (about 350 nm in this example).

The gate insulating film GI also functions as an interlevel dielectric film of the gate signal line GL and the common voltage signal line CL with the drain signal line DL, and contributes to electric insulation thereof.

i Type Semiconductor Layer AS

The i type semiconductor layer AS formed with an amorphous silicon semiconductor at a thickness of from 15 nm to 250 nm (about 120 nm in this example). A layer d0 is an N(+) type amorphous silicon semiconductor layer doped with phosphorous (P) for ohmic contact, which is left at a part, where the i type semiconductor layer AS is present under the layer d0, and an electroconductive layer d1 is present above the layer d0.

The i type semiconductor layer AS and the layer d0 are also provided at a crossing part (a crossover part) of the gate signal line GL and the common voltage signal line CL with the drain signal line DL. The i type semiconductive layer AS at the crossing part decreases the short circuit of the gate signal line GL and the common voltage signal line CL with the drain signal line DL.

Source Electrode SD1 and Drain Electrode SD2

The source electrode SD1 and the drain electrode SD2 each is formed with the electroconductive layer d1 in contact with the N(+) type semiconductive layer d0. A Cr—Mo film has low stress and thus can be formed to have a relatively large film thickness to contribute to decrease of the resistance of the line. The Cr—Mo film has good adhesion property to the N(+) type semiconductor layer d0.

Drain Signal Line DL

The drain signal line DL is formed in the same layer as the source electrode SD1 and the drain electrode SD2. The drain signal line DL is formed as integrated with the drain electrode SD2.

In this example, the electroconductive film d1 is a chromium-molybdenum alloy (Cr—Mo) film formed by sputtering at a thickness of from 50 nm to 300 nm (about 250 nm in this example). The Cr—Mo film has low stress and thus can be formed to have a relatively large film thickness to contribute to decrease of the resistance of the line.

The Cr—Mo film has good adhesion property to the N(+) type semiconductor layer d0. As the electroconductive film d1, other than the Cr—Mo film, a high melting point metal (such as Mo, Ti, Ta and W) film and a high melting point metal silicide (such as $MoSi_2$, $TiSi_2$, $TaSi_2$ and $WSi_2$) film may also be used, and an accumulated layer structure with aluminum may also be used.

Storage Capacitance Cstg

An electroconductive film ITO2 forming the storage capacitance Cstg is formed to overlap an electroconductive film ITO1 forming the counter electrode CT. The overlap constitutes a storage capacitance (electrical capacitance element) Cstg between the pixel electrode PX and the counter electrode CT as understood from FIG. 2.

The dielectric film of the storage capacitance Cstg is formed with the protective film PSV and the insulating film GI used as the gate insulating film of the thin film transistor TFT. As shown in FIG. 4, from a plane view, the storage capacitance Cstg is formed as an overlapping part of the pixel electrode PX and the counter electrode CT inside the pixel.

Protective Film PSV

The protective film PSV is formed on the thin film transistor TFT. The protective film PSV is provided mainly for protecting the thin film transistor from moisture, and a film having high transparency and high moisture resistance is used.

The protective film PSV is formed, for example, with a silicon oxide film or a silicon nitride film formed by using a plasma CVD apparatus at a film thickness of from 0.1µ to 1µ. The protective film PSV is removed to expose outer connecting terminals DTM and GTM.

With respect to the thickness of the protective film PSV and the insulating film GI, the thickness of the protective film PSV is made large taking the protection effect into consideration, and the thickness of the insulating film GI is made thin taking the mutual conductance gm of the transistor into consideration. The protective film PSV may have an accumulated structure of an organic film, such as polyimide, having a relatively large thickness of from 2 μ to 3 μ.

Pixel Electrode PX

The pixel electrode PX is formed with ITO as a transparent electroconductive material, and forms a storage capacitance with the counter electrode CT, which is similarly formed with ITO. In this example, explanation is made by using ITO as the transparent electroconductive material, but the same effect can be obtained by using indium-zinc oxide (IZO).

Counter Electrode CT

The counter electrode CT is formed with ITO and is connected to the common voltage signal line CL in the same layer. It is constituted in such a manner that the common voltage Vcom is applied to the counter electrode CT.

In this example, the common voltage Vcom is set at a potential that is lower than the intermediate direct current potential between the minimum level driving voltage Vdmin and the maximum level driving voltage Vdmax applied to the drain signal line DL by the feed through voltage ΔVs formed upon turning off the thin film transistor TFT.

In this example, explanation is made by using ITO as the transparent electroconductive material, but the same effect can be obtained by using IZO.

Color Filter Substrate

The upper transparent glass substrate SUB2 (color filter substrate) will be described in detail with reference to FIGS. 1 and 2.

Light Shielding Film BM

On the upper transparent glass substrate SUB2, as a BM boundary line shown by a heavy line in FIG. 1, a light shielding film BM (a so-called black matrix) is formed to prevent decrease of contrast caused by emission of transmitted light from an unnecessary gap (a gap other than that between the pixel electrode PX and the counter electrode CT) to the display surface.

The light shielding film BM also functions to prevent emission of outer light or back light incident on the i type semiconductor layer AS. That is, the i type semiconductor layer As of the thin film-transistor TFT is vertically sandwiched by the light shielding film BM and the relatively large gate electrode GT (FIG. 3) so as to prevent from irradiation with outer natural light and back light.

Although the light shielding film BM in FIG. 1 is shown for only one pixel, it is formed to have openings inside the respective pixels. The pattern thereof used herein is a mere example.

At a part where the direction of the electric field is disturbed, such as an edge of the comb electrode, the display has one-to-one correspondence to the image information inside the pixel, and becomes black in case of black or white in case of white. Therefore, it can be used as a part of display.

However, the light shielding film BM necessarily has a shielding function to light. In particular, at the gap between the pixel electrode PX and the counter electrode CT, the optical density thereof is necessarily 3 or more for preventing cross talk in the drain signal line direction (vertical smear).

While the light shielding film BM may be formed with a metal having electroconductivity, such as Cr, it is preferably formed with a film having high insulation property to prevent influence on the electric field between the pixel electrode PX and the counter electrode CT.

In this example, a black organic pigment is mixed with a resist material and formed to a thickness of about 1.2 μ. In order to improve the shielding property to light, carbon and titanium oxide ($Ti_xO_y$) may be mixed in an amount of such a range that can maintain the insulating property of $10^8$ Ω·cm or more, which does not affect the electric field inside the liquid crystal composition layer.

Since the light shielding film BM comparts the effective display regions of the respective lines, it also has a function of clarifying the contour of the pixel of the respective lines. The light shielding film BM is also formed in the form of frame on the periphery, the pattern of which is formed continuously from the pattern of the matrix part shown in FIG. 1.

The light shielding film BM in the periphery is extended beyond a seal part SL (see FIG. 7), so as to prevent invasion of leaked light, such as reflected light, caused by practical implementation, such as a personal computer, to the matrix part, and also to prevent leakage of light, such as back light, to the outside of the display area.

The light shielding film BM is terminated inside the edge of the substrate SUB2 by about 0.3 mm to 1.0 mm, so as to form around the cut region of the substrate SUB2.

Color Filter FIL

The color filter FIL is formed in a stripe form comprising repeating colors, red, green and blue, at the counter position of the pixels. The color filter FIL is formed to overlap the light shielding film BM.

The color filter FIL can be formed in the following manner. A dyeing base material, such as an acrylic resin, is formed on the surface of the upper transparent glass substrate SUB2, and the dyeing base material on the region other than the red filter forming region is removed by the photolithography technique.

Thereafter, the remaining dyeing base material is dyed with a red pigment, followed by subjecting to a fixing treatment, so as to form a red filter R. A green filter G and a blue filter B are then formed in the same manner. The dyeing can also be conducted with a dye.

Overcoating Film OC

An overcoating film OC is provided for preventing leakage of the dyes of the color filter FIL to the liquid crystal composition layer LC and for flattening steps formed by the color filter FIL and the light shielding film BM.

The overcoating layer is formed, for example, with a transparent resin material, such as an acrylic resin and an epoxy resin. An organic film, such as polyimide having good flowability, can also be used as the overcoating layer.

Liquid Crystal Layer and Polarizing Plate

The liquid crystal layer, the orientation film and the polarizing plate will be described below.

Liquid Crystal Layer

In this example, a nematic liquid crystal having a negative dielectric anisotropy Δξ of a value of 4.0 and a refractive index anisotropy Δn of 0.100 (589 nm, 20° C.) containing a liquid crystal molecule having a difluorinated benzene structure in the molecule is used as the liquid crystal.

In addition to the above, a liquid crystal having a dielectric anisotropy Δξ, a liquid crystal containing a liquid crystal molecule having a dicyanobenzene structure in the molecule, a liquid crystal containing a liquid crystal molecule having a difluorinated benzene structure in the molecule, a liquid crystal containing a liquid crystal molecule having a dicyanobenzene structure in the molecule, a liquid crystal containing a liquid crystal molecule having a monocyanocyclohexane structure in the molecule and a liquid crystal containing both a liquid crystal molecule having a difluorinated benzene structure in the molecule and a liquid crystal molecule having a monocyanocyclohexane structure in the molecule can be used. The liquid crystal is not limited to the foregoing composition and may be used as far as it is a liquid crystal having negative dielectric anisotropy.

The thickness of the liquid crystal composition layer (gap) is 3.0 μ, and the retardation is 0.30 μ. It is combined with the orientation film and the polarizing plate described later in such a manner that the maximum transmittance can be obtained when the liquid crystal molecules are rotated from the initial orientation direction to about 45° in the direction of the electric field, and transmitted light having substantially no dependency on the wavelength within the range of visible light can be obtained.

The thickness of the liquid crystal composition layer (gap) is controlled with polymer beads having been subjected to a vertical orientation treatment, whereby the orientation of the liquid crystal molecules in the vicinity of the beads upon displaying black is stabilized to obtain a good black level, so as to improve the contrast ratio.

The specific resistance of the liquid crystal is from $1.0 \times 10^{10}$ to $1.0 \times 10^{12}$ Ω·cm ($5.2 \times 10^{11}$ Ω·cm in this example). According to the system, the voltage charged between the pixel electrode and the counter electrode can be sufficiently maintained even when the resistance of the liquid crystal is low.

The lower limit thereof is $1.0 \times 10^9$ Ω·cm, and preferably $1.0 \times 10^{10}$ Ω·cm. This is because the pixel electrode and the counter electrode are constituted on the same substrate. When the resistance is too high, static charge formed during the production process is difficult to be relaxed, and therefor it is $1.0 \times 10^{13}$ Ω·cm or less, and preferably $1.0 \times 10^{12}$ Ω·cm or less.

Orientation Film

Polyimide is used as the orientation film ORI. The initial orientation directions RDR of the upper and the lower substrates are parallel to each other. As a method for applying the initial orientation direction, rubbing is generally employed, and oblique vapor deposition may also be used.

Figure 5:
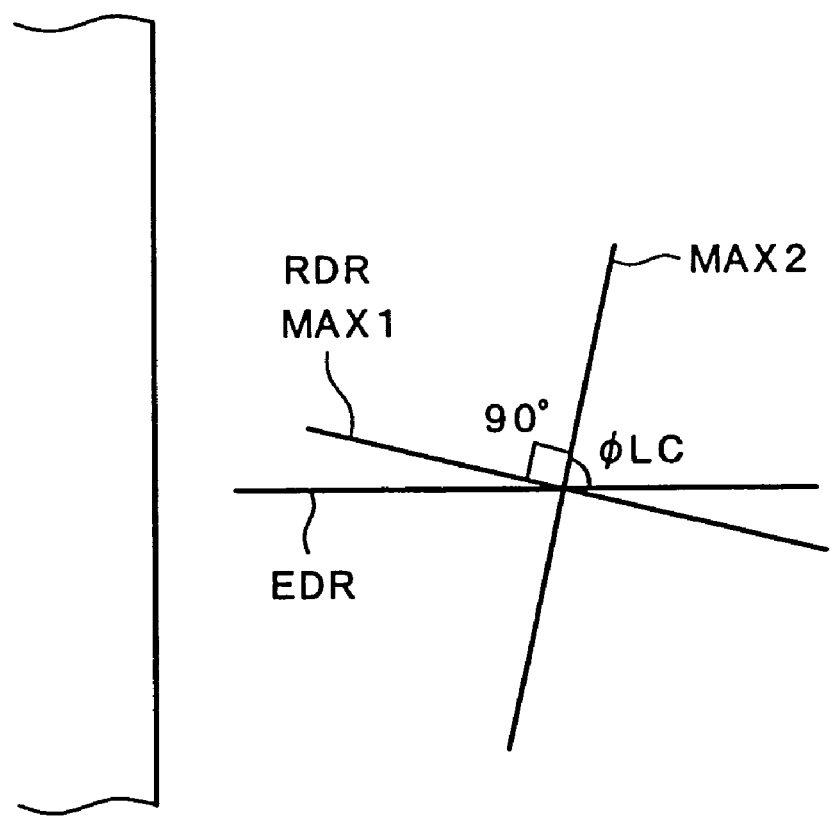
FIG. 5 is a diagram showing the relationship of an electric field application direction and a rubbing direction to a transmitting axis of a polarizing plate.

The relationship between the initial orientation direction RDR and the applied electric field direction EDR is shown in FIG. 5. In this example, the initial orientation direction RDR is about 75° with respect to the horizontal direction. In the constitution of this example using the liquid crystal composition having negative dielectric anisotropy, the angle formed between the initial orientation direction RDR and the applied electric field direction EDR is necessarily 45° or more and less than 90°. The orientation film is formed to have a thickness of from 20 nm to 300 nm (about 100 nm in this example).

Polarizing Plate

A polarizing plate having electroconductivity is used as the polarizing plates POL1 and POL2. The polarized light transmitting axis MAX1 of the upper polarizing plate POLL agrees to the initial orientation direction RDR, and the polarized light transmitting axis MAX2 of the lower polarizing plate POL2 is perpendicular thereto. The relationships are shown in FIG. 5.

According to the configuration, normally close characteristics can be obtained in that the transmittance is increased associated with increase of the voltage applied to the pixel of the invention (the voltage between the pixel electrode PX and the counter electrode CT). When no voltage is applied, black display of good quality can be obtained.

In this example, countermeasures for display failure caused by external static charge and EMI are conducted by imparting electroconductivity to the polarizing plates. The electroconductivity is preferably a sheet resistance of $10^8$ Ω per square or less when the countermeasure only for static charge is necessary, and is preferably a sheet resistance of $10^4$ Ω per square or 1 ss when the countermeasure for EMI is also necessary. It is also possible to provide an electroconductive layer on the surface of the glass substrate opposite to the surface having the liquid crystal composition supported thereon (i.e., the surface having the polarizing plate is adhered).

Constitution Around Matrix

Figure 7A:
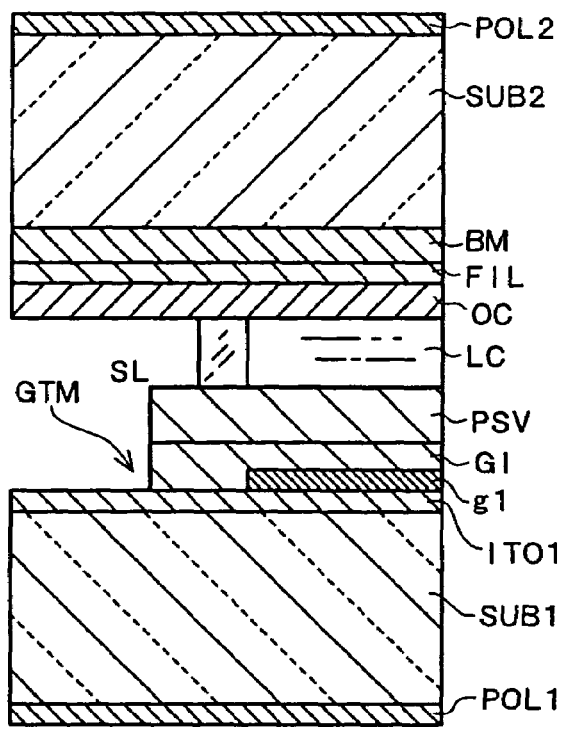
FIG. 7A is a diagram showing a panel edge part having a gate signal terminal.
Figure 7B:
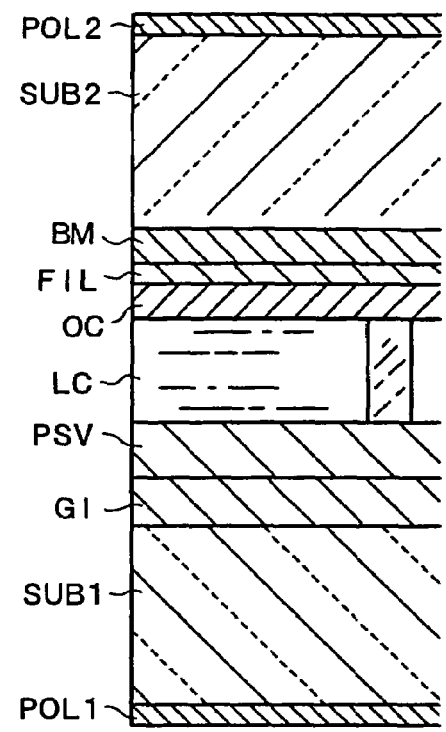
FIG. 7B is a diagram showing a panel edge part having no terminal for external connection.

FIG. 6 is a plane view showing an important part around a matrix (AR) of the display panel PNL containing the upper and lower glass substrates SUB1 and SUB2. FIG. 7A is a cross sectional view showing the part around the external connecting terminal GTM, to which a scanning circuit is to be connected, and FIG. 7B is a cross sectional view showing the part around the seal part having no external connecting terminal.

Upon production of the panel, plural devices are worked on one glass substrate, followed by dividing, to improve the throughput when the size is small, and when the size is large, in order for common use of the production equipments, a glass substrate of the standardized size is worked for any kind of product, followed by cutting into the size for the respective kinds of product.

In any case, the glass is cut after subjecting the predetermined process. FIGS. 6, 7A and 7B show the latter example and shows the state after cutting the upper and lower substrates SUB1 and SUB2. The symbol LN in FIG. 6 means the edges of the substrates before cutting.

In any case, the size of the upper substrate SUB2 is limited inside the lower substrate SUB1 in the finalized state in such a manner that the part having the external connecting terminals Tg and Td and the terminal CTM (the upper periphery and the left periphery in FIG. 6) is exposed.

The terminals Tg and Td refer to a plurality of units of tape carrier packages TCP (see FIG. 13) containing a scanning circuit connecting terminal GTM and a drain signal circuit connecting terminal DTM, both of which will be described later, as well as outgoing line parts thereof mounted on an integrated circuit chip CHI (see FIG. 13).

The groups of the outgoing lines from the matrix part to the external connecting terminal part is inclined toward the both ends thereof. This is because the terminals DTM and GTM of the display panel PNL are conformed to the intervals of the arrangement of the package TCP and the connecting terminals of the package TCP.

The counter electrode terminal CTM is a terminal for applying the common voltage from an external circuit to the counter electrode CT. The common voltage signal line CL in the matrix part is drawn to the opposite side of the scanning circuit terminal GTM (the right side in FIG. 6), and the respective common voltage signal lines are integrated to a common bas line CB, which is connected to the counter electrode terminal CTM.

A seal pattern SL is formed along the edges of the transparent glass substrates SUB1 and SUB2 to seal the liquid crystal CL except for a liquid crystal inlet INJ. The sealing material comprises, for example, an epoxy resin. The layers of the orientation films ORI1 and ORI2 are formed inside the seal pattern SL. The polarizing plates POL1 and POL2 are formed on the outer surfaces of the lower transparent glass substrate SUB1 and the upper transparent glass substrate SUB2, respectively. The liquid crystal LC is filled in the region comparted by the seal pattern SL between the lower orientation film ORI1 and the upper orientation film ORI2 setting the direction of the liquid crystal molecules. The lower orientation film ORI1 is formed above the protective film PSV on the side of the lower transparent glass substrate SUB1.

The liquid crystal display device is fabricated in such a manner that the various layers are accumulated separately on the side of the lower transparent glass substrate SUB1 and the side of the upper transparent glass substrate USB2, and the lower transparent glass substrate SUB1 and the upper transparent glass substrate SUB2 are superimposed each other.

Thereafter, the liquid crystal LC is filled from the opening INJ of the seal material SL, and the injection opening INJ is sealed, for example, with an epoxy resin, followed by cutting the upper and lower substrates.

Gate Terminal Part

FIGS. 8A and 8B are diagrams showing the connecting structure from the gate signal line of the display matrix to the external connection terminal GTM thereof. FIG. 8A is a plane view, and FIG. 8B is a cross sectional view on line B-B in FIG. 8A.

FIGS. 8A and 8B correspond to the left lower part of FIG. 6, and the part of the inclined line is expressed by a straight line for convenience. In FIGS. 8A and 8B, hatching is given to the Cr—Mo layer g1 for easy understanding.

The gate terminal GTM comprises the Cr—Mo layer g1 and a transparent electroconductive layer ITO1 for protecting the surface of the Cr—Mo layer and for improving the reliability of the connection to the TCP (tape carrier package).

The transparent electroconductive layer ITO1 is formed with a transparent electroconductive film ITO. As shown in FIG. 8B, the insulating film G1 and the protective film PSV are formed on the right side of FIG. 8B, and the terminal part GTM on the left edge is exposed from the insulating film GI and the protective film PSV to enable electric contact with an outer circuit.

While only one pair of the gate line GL and the gate terminal GTM is shown in FIGS. 8A and 8B, plurality of the pairs are actually arranged in the vertical direction to constitute a group of the terminals Tg (see FIG. 10), and the left side in FIGS. 8A and 8B of the gate terminal GTM is extended beyond the cutting region of the substrates during the production process and is shorted with a short circuit line SHg (not shown in the figure). The short circuit formed by the short circuit line SHg prevents electrostatic damage of the orientation film ORI1 due to rubbing during the production process.

Drain Terminal DTM

Figure 9A:
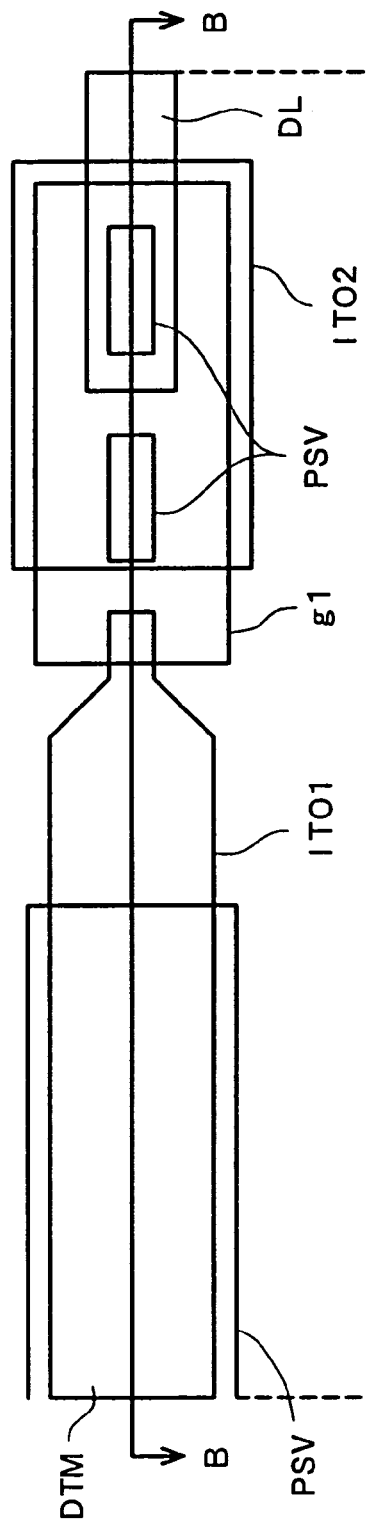
FIGS. 9A and 9B are a plane view and a cross sectional view, respectively, of an example of a structure in the vicinity of a connecting part of a drain terminal DTM and a drain signal line DL.
Figure 9B:
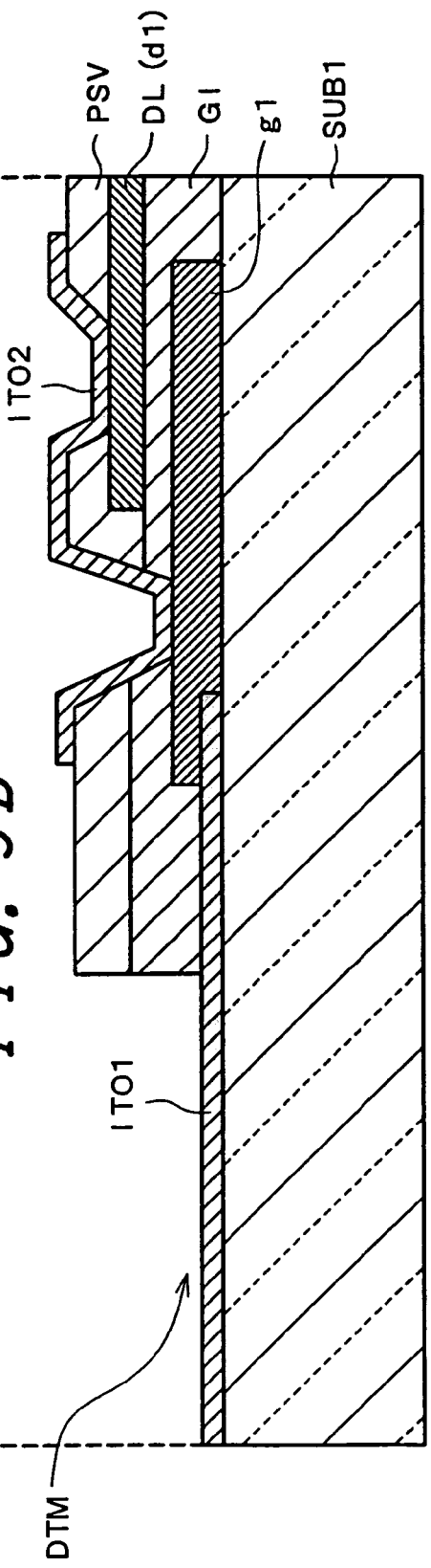

FIGS. 9A and 9B are diagrams showing the connecting structure from the drain signal line DL to the external connecting terminal DTM thereof. FIG. 9A is a plane view, and FIG. 9B is a cross sectional view on line B-B in FIG. 9A. FIGS. 9A and 9B correspond to the right upper part of FIG. 6, and the right end corresponds to the upper end of the substrate SUB1 while the aspect of the figures is changed for convenience.

Figure 13:
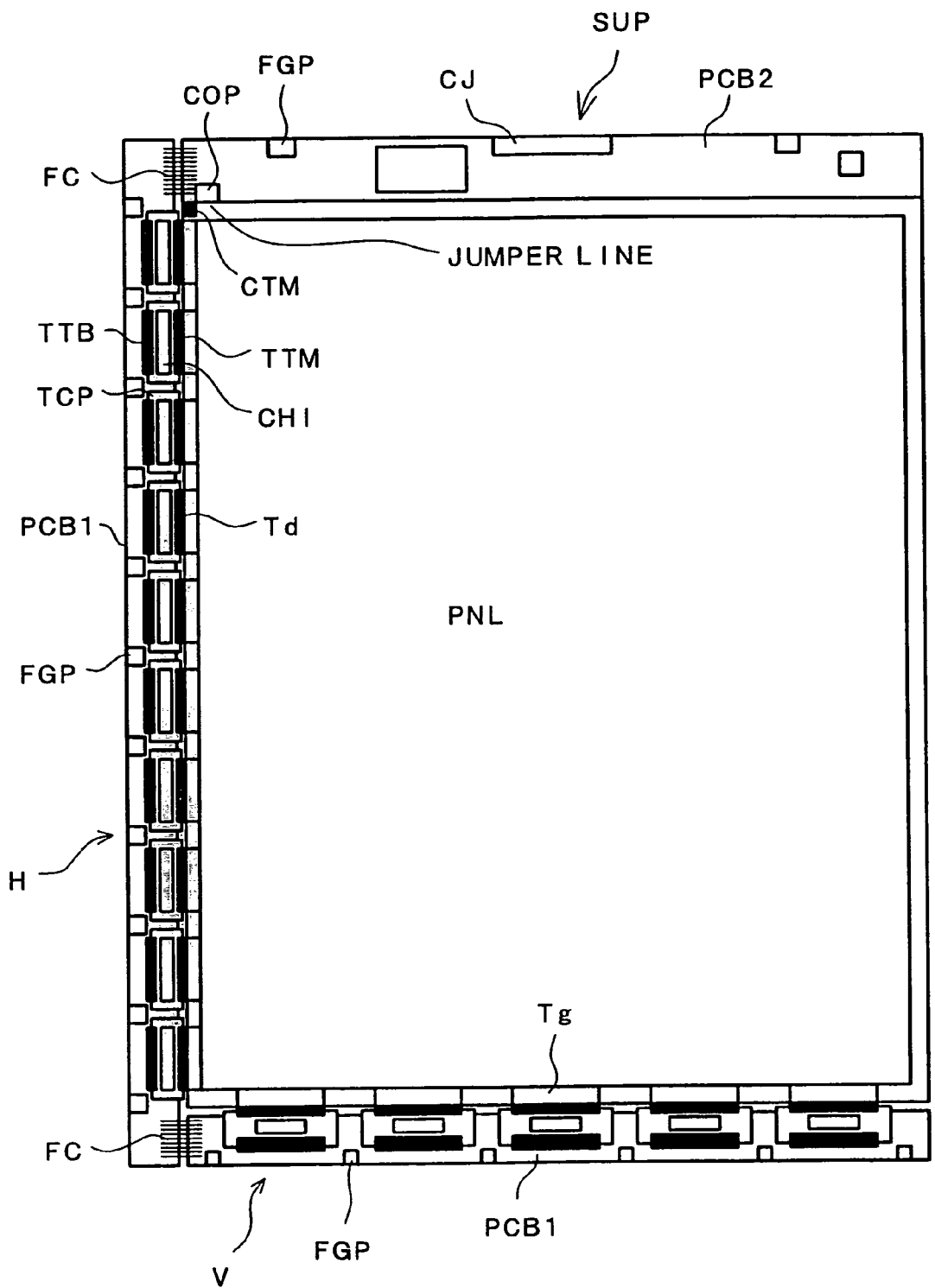
FIG. 13 is a top view showing a liquid crystal display panel having a peripheral driving circuit mounted thereon.
Figure 14:
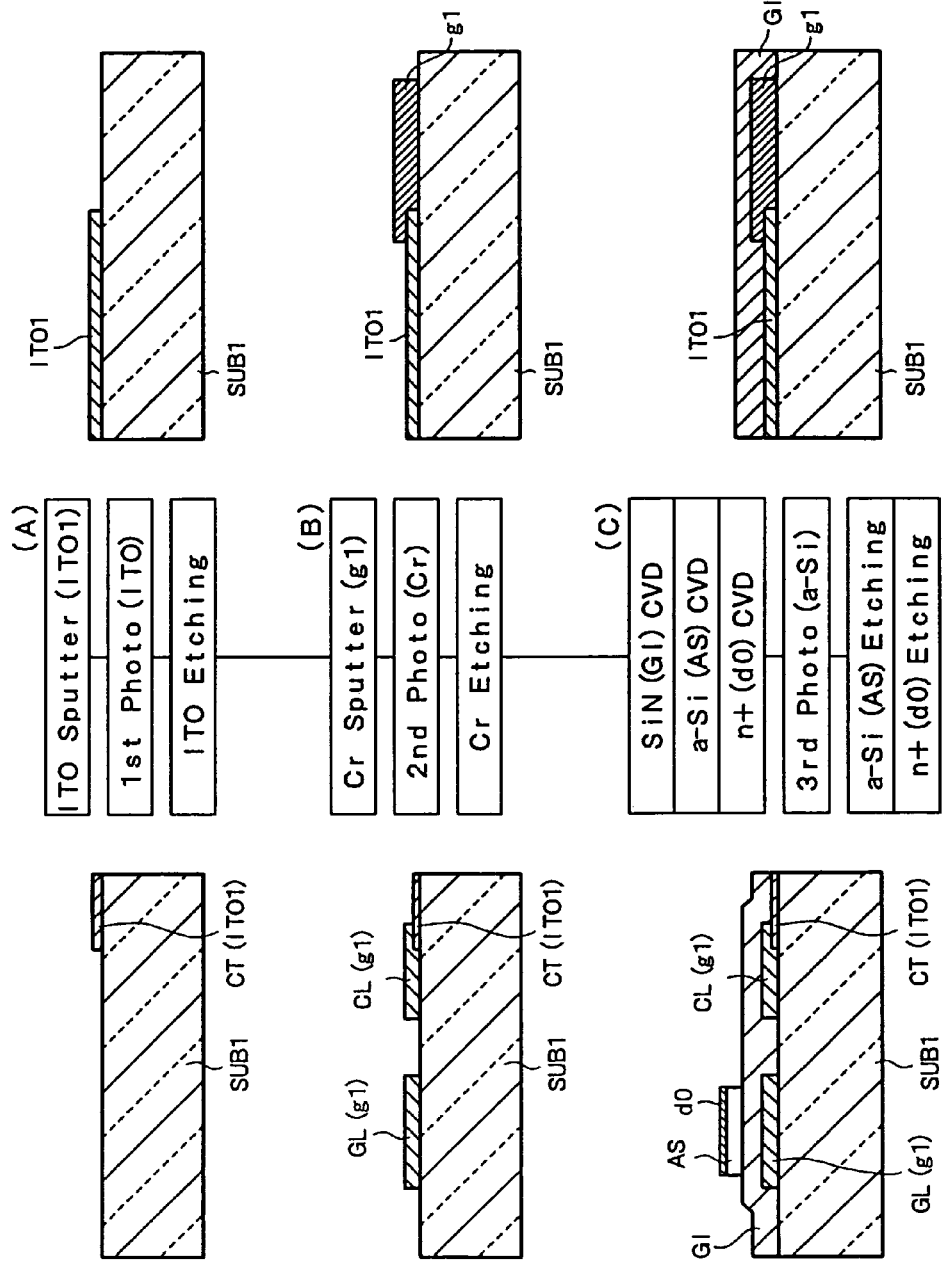
FIGS. 14A to 14C are diagrams showing a production process of a substrate SUB1.
Figure 15:
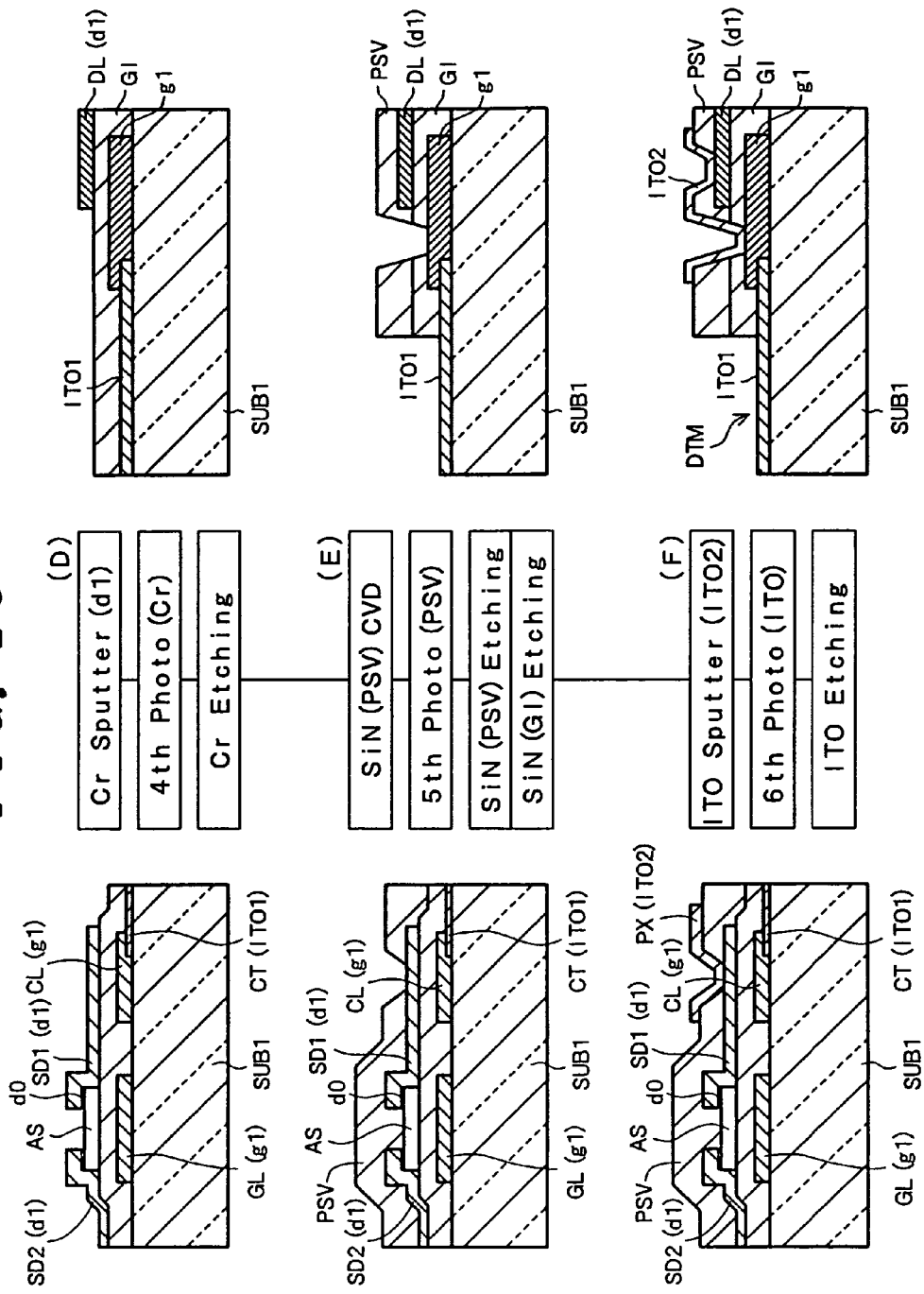
FIGS. 15D to 15F are diagrams showing a production process of a substrate SUB1 subsequent FIGS. 14A to 14C.

The external connecting drain terminal DTM is arranged in the vertical direction, and the drain terminal DTM constitutes the group of terminals Td (suffix omitted) as shown in FIG. 13 and are extended beyond the cutting line of the substrate SUB1. The drain terminal DTM is extended beyond the cutting region of the substrate during the production process, and all of them are shorted with a short circuit line SHd (not shown in the figure) for preventing electrostatic damage.

The drain connecting terminal DTM is formed with a transparent electroconductive layer ITO1 and is connected to the drain signal line DL at the part where the protective film PSV is removed. The transparent electroconductive film ITO1 is formed with a transparent electroconductive film ITO as similar to the case of the gate terminal GTM. The outgoing line from the matrix part to the drain terminal part DTM is formed with the layer d1, which is the same level as the drain signal line DL.

Counter Electrode Terminal CTM

FIGS. 10A and 10B are diagrams showing the connecting structure from the common voltage signal line CL to the external connecting terminal CTM thereof. FIG. 10A is a plane view, and FIG. 10B is a cross sectional view on line B-B in FIG. 10A. FIGS. 10A and 10B correspond to the left upper part of FIG. 6.

The respective common voltage signal lines CL are integrated to a common bas line CB, which is withdrawn to the counter electrode terminal CTM. The common bas line CB has such a structure that an electroconductive layer g3 (not shown in the figure) is accumulated on the electroconductive layer g1, which are electrically connected with the transparent electroconductive layer ITO1.

This is because the resistance of the common bas line CB is decreased, and the common voltage is sufficiently supplied from an external circuit to the respective common voltage signal lines CL. The structure has such characteristics that the resistance of the common bas line can be decreased without addition of another electroconductive layer.

The counter electrode terminal has such a structure that the transparent electroconductive layer ITO1 is accumulated on the electroconductive layer g1. The transparent electroconductive film ITO1 is formed with a transparent electroconductive film ITO as similar to the cases of the other terminals.

The electroconductive layer g1 is covered with the transparent electroconductive layer ITO1 to protect the surface thereof and to prevent electric corrosion thereof.

The connection of the transparent electroconductive layer ITO1 with the electroconductive layer g1 and the electroconductive layer d1 is effected through a through hole formed via the protective film PSV and the insulating film GI.

Total Equivalent Circuit of Display Device

Figure 11:
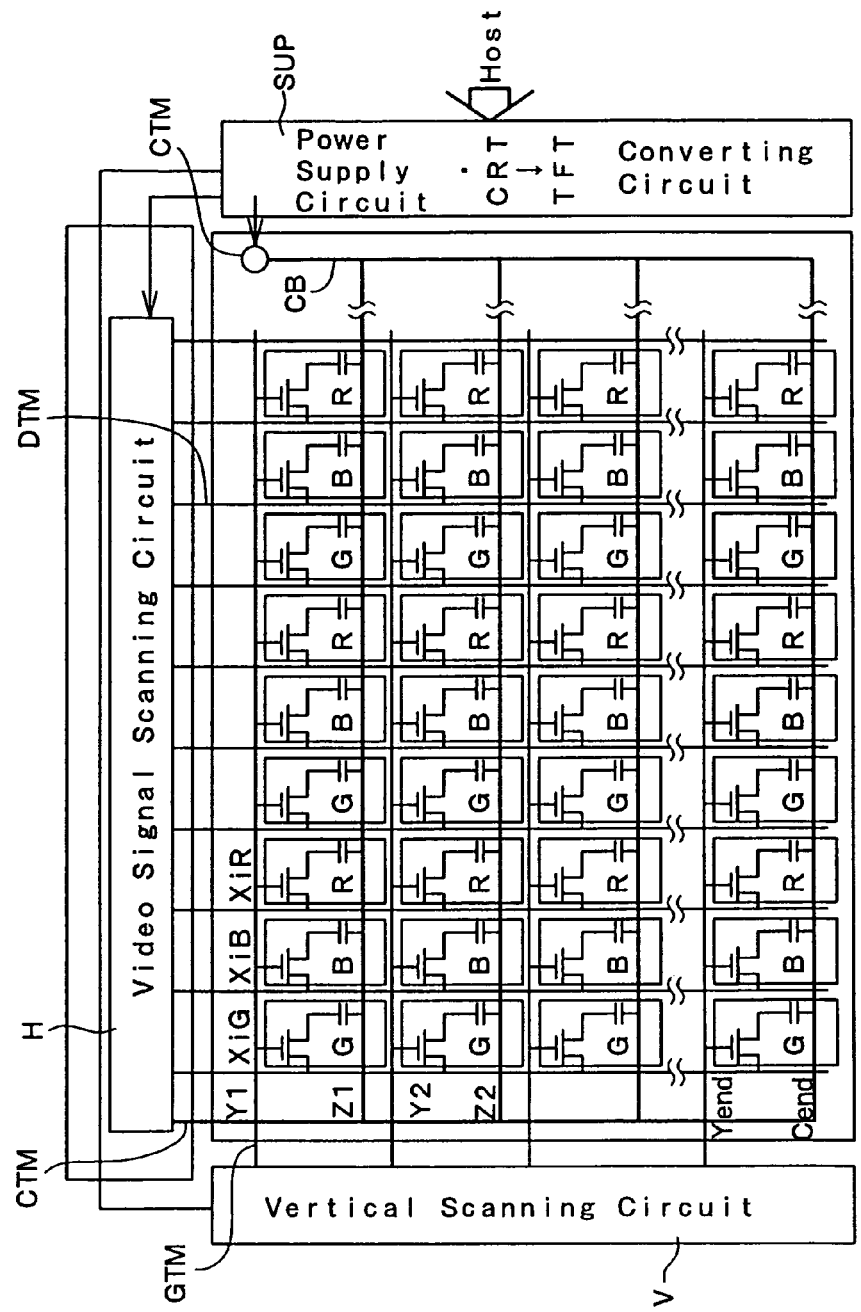
FIG. 11 is a diagram showing a circuit diagram of a matrix part and a periphery thereof of an active matrix color liquid crystal display device.

A wiring diagram of the equivalent circuit of the display matrix part and a peripheral circuit thereof is shown in FIG. 11. While FIG. 11 is a circuit diagram, it is drawn to correspond to the actual geometric arrangement.

Plural pixels are two-dimensionally arranged to form a matrix array. In FIG. 11, the symbol X denotes the drain signal line DL, and the suffixes G, B and R are attached to correspond to a green pixel, a blue pixel and a red pixel, respectively. The symbol Y denotes a gate signal line GL, and the suffixes 1, 2, 3 to end are attached to correspond to the order of scanning timing.

The gate signal line Y (suffix omitted) is connected to a vertical scanning circuit V, and the drain signal line X (suffix omitted) is connected to a drain signal driving circuit H. The symbol SUP denotes a circuit containing a power source circuit for obtaining plural stabilized power sources obtained by dividing one power source and a circuit for converting display information from a host (host operation processing device) for a CRT (cathode ray tube) to display information for a TFT liquid crystal display device.

Driving Method

Figure 12:
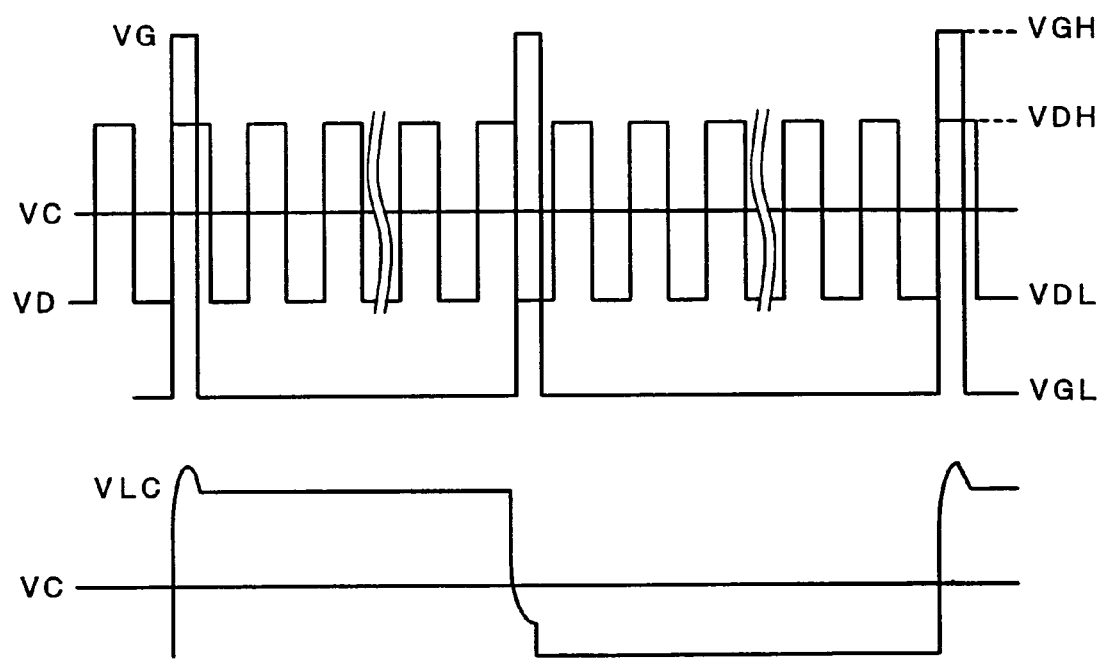
FIG. 12 is a diagram showing a driving waveform of an active matrix color display device according to the invention.

FIG. 12 shows a driving waveform of the liquid crystal display device of this example. A gate signal VG takes an on-level per one scanning period, and the others take an off-level. A drain signal voltage VD is applied in such a manner that a positive pole and a negative pole are applied to one pixel by inverting per one flame at an amplitude of twice the voltage to be applied to the liquid crystal layer.

The polarity of the drain signal voltage VD is inverted per one column and is also inverted per two lines. Accordingly, pixels having inverted polarities are arranged adjacent to each other in the vertical and horizontal directions (i.e., dot inversion driving), and thus flicker and cross talk (smear) are difficult to be formed.

The common voltage Vc is set at a voltage below the center voltage of the polarity inversion of the drain signal voltage by a constant amount. This is to compensate the feedthrough voltage formed upon changing the thin film transistor TFT from the on-state to the off-state, and is conducted by applying an alternating current voltage VLC having less direct current component to the liquid crystal. (A liquid crystal suffers severe after image and deterioration when a direct current is applied thereto.)

Surface Panel PNL and Driving Circuit Board PCB1

FIG. 13 shows a top view showing the sate where the display panel PNL shown in FIG. 6 having the drain signal driving circuit H and the vertical scanning circuit V connected thereto.

The symbol CHI denotes a driving IC chips for driving the display panel PNL (in which the lower five chips are driving IC chips for the vertical scanning circuit, and the left ten chips are driving IC chips for the drain signal driving circuit).

The symbol TCP denotes a tape carrier package having the driving IC chips CHI are mounted by a tape automated bonding method (TAB), and PCB1 denotes a driving circuit board having the TCP and capacitors mounted thereon, which is divided into two, i.e., one for the drain signal driving circuit and the other for the gate signal driving circuit.

The symbol FGP denotes a flame ground pad, which is soldered to a spring form fragment provided by cutting a shield case SHD. The symbol FC denotes a flat cable connecting the lower driving circuit board PCB1 and the left driving circuit board PCB1.

As the flat cable FC, one comprising plural lead wires (comprising phosphor bronze plated with Sn) supported by sandwiching with a polyethylene layer in a stripe form and a polyvinyl alcohol layer is used.

Production Process

The production process of the substrate SUB1 of the liquid crystal display device described in the foregoing will be described with reference to FIGS. 14A to 14C and 15D to 15F below. In FIGS. 14A to 14C and 15D to 15F, abbreviated names of the steps are shown in the center of the figures, and the work flow is shown by cross sectional views, in which the thin film transistor TFT part shown in FIG. 3 is shown on the left side, and the part around the gate terminal shown in FIGS. 8A and 8B is shown on the left side.

The steps A to F are divided corresponding to the respective photographic processes, and the cross sectional views of the steps show the stage where the treatment after the photographic process is completed, and the photoresist has been removed.

The photographic process referred herein means a series of operations including coating of a photoresist, selective exposure through a mask and development thereof. The steps A to C will be described with reference to FIGS. 14A to 14C, and the steps D to F will be described with reference to FIGS. 15D to 15F, but repetition of explanation will be omitted.

(a) Step A

An electroconductive film ITO1 comprising ITO having a film thickness of 100 .ANG. is provided on a lower transparent glass substrate SUB1 comprising AN635 Glass (a trade name) by sputtering. After subjecting to a photographic process, the electroconductive film ITO1 is selectively etched with an HBr solution, so as to form a counter electrode CT.

(b) Step B

An electroconductive film g1 comprising Cr having a film thickness of 200 nm is provided by sputtering. After subjecting to a photographic process, the electroconductive film g1 is selectively etched with ceric nitrate ammon, so as to form a gate electrode GT, a gate signal line GL, a common voltage signal line CL, a gate terminal GTM, a first electroconductive layer of a common bas line CB, a first electroconductive layer of a counter electrode terminal CTM1 and a bas line SHg (not shown in the figure) connecting the gate terminal GTM. The material of the electrode is not limited to Cr, and Mo, Ti, Ta, W and an alloy thereof may be used.

(c) Step C

An ammonia gas, a silane gas and a nitrogen gas are introduced into a plasma CVD apparatus to provide a silicon nitride film having a film thickness of 350 nm. A silane gas and a hydrogen gas are introduced into the plasma CVD apparatus to provide an i type amorphous Si film having a film thickness of 120 nm is provided, and then a hydrogen gas and a phosphine gas are introduced into the plasma CVD apparatus to provide an N(+) type amorphous Si film having a film thickness of 30 nm.

After subjecting to a photographic process, the N(+) type amorphous Si film and the i type amorphous Si film are selectively etched by using $SF_6$ and $CCl_4$ as a dry etching gas, so as to form islands of an i type semiconductor layer AS.

(d) Step D

An electroconductive film d1 comprising Cr having a film thickness of 30 nm is provided by sputtering. After subjecting to a photographic process, the electroconductive film d1 is etched by the same liquid as in the step B, so as to form a drain signal line DL, a source electrode SD1, a drain electrode SD2, a first electroconductive layer of a common bas line CB2 and a bas line SHd (not shown in the figure) shorting the drain terminal DTM. The material of the electrode is not limited to Cr, and Mo, Ti, Ta, W and an alloy thereof may be used.

The N(+) type amorphous Si film is etched by introducing $CCl_4$ and $SF_6$ into a dry etching apparatus, so as to selectively remove the N(+) type semiconductor layer d0 between the source and the drain.

After patterning the electroconductive film d1 with a mask pattern, the N(+) type semiconductor layer d0 is removed by using the electroconductive film d1 as a mask. That is, the N(+) type semiconductor layer d0 remaining on the i type semiconductor layer AS is removed in a self aligning manner except for the part where the electroconductive film d1 is present. At this time, since the whole thickness of the N(+) type semiconductor layer d0 is removed by etching, the surface part of the i type semiconductor layer AS is also slightly etched, and the extent thereof can be controlled by the etching time.

(e) Step E

An ammonia gas, a silane gas and a nitrogen gas are introduced into the plasma CVD apparatus to provide a silicon nitride film having a film thickness of 0.4 μ. After subjecting to a photographic process, the silicon nitride film is selectively etched by using $SF_6$ as a dry etching gas, so as to pattern a protective film PSV and an insulating film GI.

(f) Step F

An electroconductive film ITO2 comprising ITO having a film thickness of 12 nm is provided by sputtering. After subjecting to a photographic process, the electroconductive film ITO2 is selectively etched with an HBr solution, so as to form a pixel electrode PX.

Dissociative Dopant

The characteristic feature of this example is that 100 ppm of 2,5-dimethylphenol is added to the mother liquid crystal. The mother liquid crystal has a specific resistance of $1.9 \times 10^{13}$ Ω·cm and an NI point of 70.5° C. When 2,5-dimethylphenol shown by the following structural formula is added thereto, the specific resistance becomes $5.2 \times 10^{11}$ Ω·cm. The NI point of the liquid crystal is 70.4° C., which is substantially the same as the liquid crystal before the addition. 3

2,5-Dimetnylphenol

The dissociative dopant used in this example means an acidic dissociative substance or a basic dissociative substance, or in other words, a substance generating an $H^+$ ion through dissociation by itself in a polar solvent or generating an OH⁻ ion through a reaction with water.

Specific examples thereof include a carboxylic acid (including an anhydride thereof), an amide, an amine and an alcohol. When these substances are added to a liquid crystal, the ion concentration in the liquid crystal is increased, so as to decrease the specific resistance.

Evaluation of display quality of the liquid crystal display device of Example 1 according to the invention is conducted and reveals that high quality display is confirmed, and substantially no formation of after image failure is observed.

EXAMPLE 2

Example 2 of a liquid crystal display device according to the invention is the same as Example 1 except that the addition amount of the dopant used is changed to 1,000 ppm. The mother liquid crystal has a specific resistance of $1.9 \times 10^{13}$ $\Omega \cdot cm$ and an NI point of 70.5° C. When 2,5-dimethylphenol is added thereto, the specific resistance becomes $2.5 \times 10^{10}$ $\Omega \cdot cm$. The NI point of the liquid crystal is 70.2° C., which is substantially the same as the liquid crystal before the addition.

Evaluation of display quality of the liquid crystal display device of Example 2 according to the invention is conducted and reveals that high quality display is confirmed, and substantially no formation of after image failure is observed.

CL EXAMPLE 3

Example 3 of a liquid crystal display device according to the invention is the same as Example 1 except that the thickness of the orientation film used is changed to 50 nm.

Evaluation of display quality of the liquid crystal display device of Example 3 according to the invention is conducted and reveals that high quality display is confirmed, and substantially no formation of after image failure is observed.

EXAMPLE 4

Example 4 of a liquid crystal display device according to the invention is the same as Example 1 except that the thickness of the orientation film used is changed to 300 nm.

Evaluation of display quality of the liquid crystal display device of Example 4 according to the invention is conducted and reveals that high quality display is confirmed, and substantially no formation of after image failure is observed.

EXAMPLE 5

Example 5 of a liquid crystal display device according to the invention is the same as Example 1 except that the distance between the pixel electrodes is 2 μ.

Evaluation of display quality of the liquid crystal display device of Example 5 according to the invention is conducted and reveals that high quality display is confirmed, and substantially no formation of after image failure is observed.

EXAMPLE 6

Example 6 of a liquid crystal display device according to the invention is the same as Example 1 except that a nematic liquid crystal containing a liquid crystal molecule having a monocyanocyclohexane structure in the molecule is used. The mother liquid crystal has a specific resistance of $3.5 \times 10^{12}$ $\Omega \cdot cm$ and an NI point of 71.5° C. When 2,5-dimethylphenol is added thereto, the specific resistance becomes $2.5 \times 10^{11}$ $\Omega \cdot cm$. The NI point of the liquid crystal is 71.2° C., which is substantially the same as the liquid crystal before the addition.

Evaluation of display quality of the liquid crystal display device of Example 6 according to the invention is conducted and reveals that high quality display is confirmed, and substantially no formation of after image failure is observed.

EXAMPLE 7

Example 7 of a liquid crystal display device according to the invention is the same as Example 1 except that 500 ppm of 2,5-dimethylaniline shown by the following structural formula is used as the dopant. The mother liquid crystal has a specific resistance of $1.9 \times 10^{13}$ $\Omega \cdot cm$ and an NI point of 70.5° C.

When 2,5-dimethylaniline is added thereto, the specific resistance becomes $1.2 \times 10^{11}$ $\Omega \cdot cm$. The NI point of the liquid crystal is 70.1° C., which is substantially the same as the liquid crystal before the addition. 4

2,5-Dimetnylaniline

Evaluation of display quality of the liquid crystal display device of Example 7 according to the invention is conducted and reveals that high quality display is confirmed, and substantially no formation of after image failure is observed.

EXAMPLE 8

Example 8 of a liquid crystal display device according to the invention is the same as Example 1 except that 2,000 ppm of 2,5-dimethoxyphenol shown by the following structural formula is used as the dopant. The mother liquid crystal has a specific resistance of $1.9 \times 10^{13}$ $\Omega \cdot cm$ and an NI point of 70.5° C.

When 2,5-dimethoxyphenol is added thereto, the specific resistance becomes $1.2 \times 10^{10}$ $\Omega \cdot cm$. The NI point of the liquid crystal is 70.3° C., which is substantially the same as the liquid crystal before the addition. 5

2,5-Dimethoxyphenol

Evaluation of display quality of the liquid crystal display device of Example 8 according to the invention is conducted and reveals that high quality display is confirmed, and substantially no formation of after image failure is observed.

EXAMPLE 9

Example 9 of a liquid crystal display device according to the invention is the same as Example 1 except that 300 ppm of 2,5-diethoxy-4-morphorinoaniline dihydrochloride shown by the following structural formula is used as the dopant. The mother liquid crystal has a specific resistance of $1.9 \times 10^{13}$ $\Omega \cdot cm$ and an NI point of 70.5° C. When 2,5-diethoxy-4-morphorinoaniline dihydrochloride is added thereto, the specific resistance becomes $2.5 \times 1011^{+}\Omega \cdot cm$. The NI point of the liquid crystal is 70.2° C., which is substantially the same as the liquid crystal before the addition. 6

2,5-Diethoxy-4-morphorinoaniline Dihydrochloride

Evaluation of display quality of the liquid crystal display device of Example 9 according to the invention is conducted and reveals that high quality display is confirmed, and substantially no formation of after image failure is observed.

EXAMPLE 10

Example 10 of a liquid crystal display device according to the invention is the same as Example 1 except that 900 ppm of 4-(2,5-diethoxy-4-nitrophenyl) morphrinone shown by the following structural formula is used as the dopant. The mother liquid crystal has a specific resistance of $1.9\times10^{13}$ Ω·cm and an NI point of 70.5° C. When 2,5-diethoxy-4-morphorinoaniline dihydrochloride is added thereto, the specific resistance becomes $8.9\times10^{10}$ Ω·cm. The NI point of the liquid crystal is 70.2° C., which is substantially the same as the liquid crystal before the addition. 7

4-(2,5-Diethoxy-4-nitrophenyl)morphrinone

Evaluation of display quality of the liquid crystal display device of Example 10 according to the invention is conducted and reveals that high quality display is confirmed, and substantially no formation of after image failure is observed.

COMPARATIVE EXAMPLE 1

Comparative Example 1 of a liquid crystal display device is the same as Example 1 except that 2-cyano-3-fluoro-5-(4-n-propyl-trans-cyclohexyl)phenol shown by the following structural formula is used as the dopant. The mother liquid crystal has a specific resistance of $1.9\times10^{13}$ Ω·cm and an NI point of 70.5° C. When 1,000 ppm of 2-cyano-3-fluoro-5-(4-n-propyl-trans-cyclohexyl)phen-ol is added thereto, the specific resistance becomes $3.3\times10^{11}$ Ω·cm. The NI point of the liquid crystal is 70.4° C., which is substantially the same as the liquid crystal before the addition. 8

2-Cyano-3-fluoro-5-(4-n-propyl-trans-cyclohexyl)phenol

Evaluation of display quality of the liquid crystal display device of Comparative Example 1 is conducted and reveals that high quality display is confirmed, but an after image failure is observed.

COMPARATIVE EXAMPLE 2

Comparative Example 2 of a liquid crystal display device is the same as Example 1 except that 2-cyano-3-fluoro-5-(4-n-propyl-trans-bicycl-ohexyl)phenol shown by the following structural formula is used as the dopant. The mother liquid crystal has a specific resistance of $1.9\times10^{13}$ Ω·cm and an NI point of 70.5° C. When 100 ppm of 2-cyano-3-fluoro-5-(4-n-propyl-trans-bicyclohexyl)phen-ol is added thereto, the specific resistance becomes $5.5\times10^{12}$ Ω·cm. The NI point of the liquid crystal is 70.3° C., which is substantially the same as the liquid crystal before the addition. 9

2-Cyano-3-fluoro-5-(4-n-propyl-trans-bicyclohexyl)phenol

Evaluation of display quality of the liquid crystal display device of Comparative Example 2 is conducted and reveals that high quality display is confirmed, but an after image failure is observed.

Figure 16:
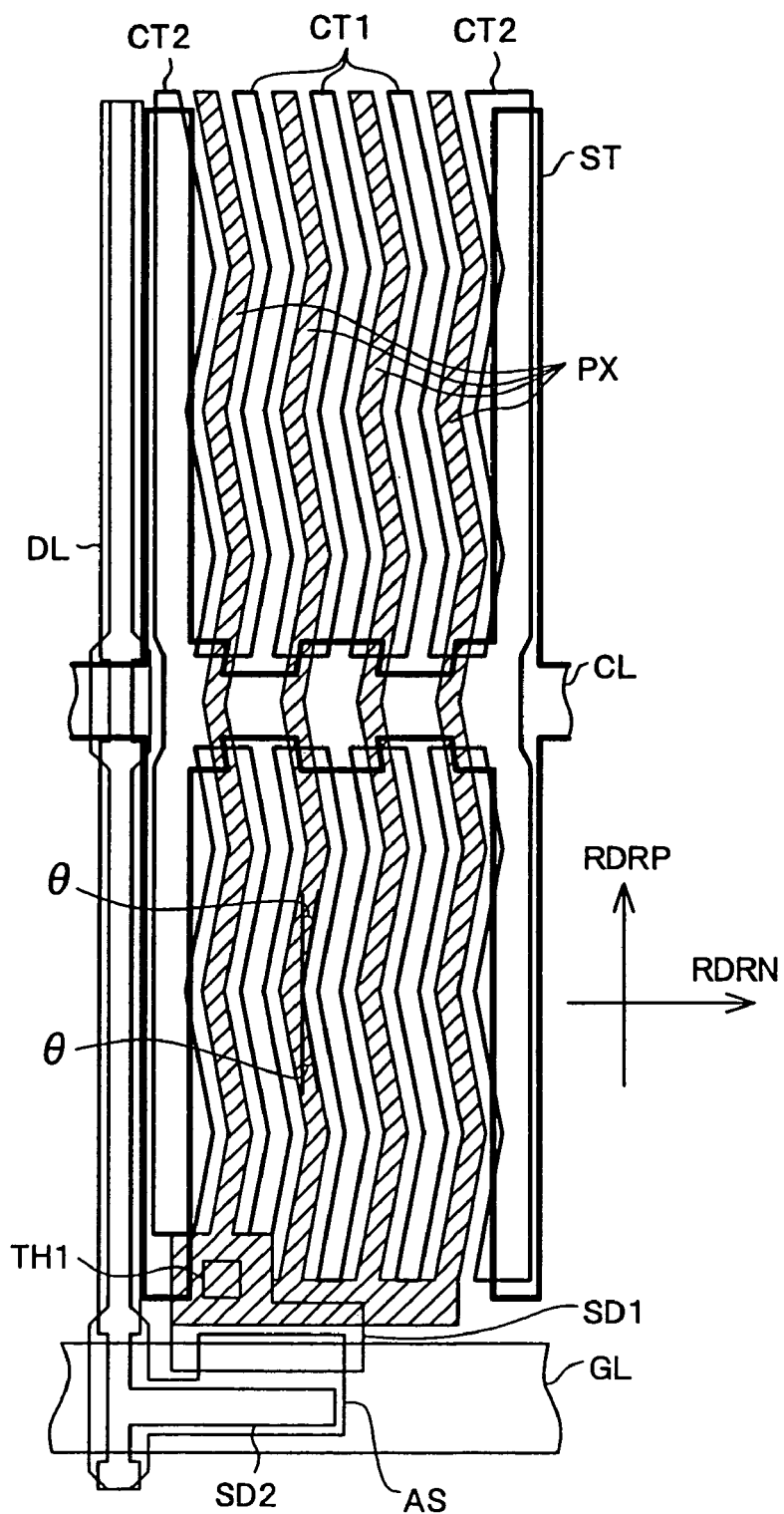
FIG. 16 is a plane view showing one pixel of another example of a liquid crystal display part of an active matrix color liquid crystal display device.

FIG. 16 is a plane view of another example of the invention. In this example, a pixel electrode PX and counter electrodes CT1 and CT2 are in a wave form (a zigzag form). According to the constitution, two regions (domains) having reorientation states that are different from each other in direction are formed, and thus they compensates by each other inversion of coloring and gradation in oblique directions, whereby a wide viewing angle can be obtained.

That is, the respective electrodes have a zigzag form having plural crooked parts in the running direction thereof, and one side on the crooked part has an angle θ with respect to the vertical direction RDRP in FIG. 16, whereas the other side on the crooked part has an angle 180°-θ.

According to the configuration, the two regions (domains) having reorientation states that are different from each other in direction are formed, and thus they compensates by each other inversion of coloring and gradation in oblique directions, whereby a wide viewing angle can be obtained.

The vertical direction RDRP also shows the initial orientation direction of an orientation film ORI for a liquid crystal molecule having positive dielectric anisotropy (Np liquid crystal), and the horizontal direction RDRN shows the initial orientation direction of an orientation film ORI for a liquid crystal molecule having negative dielectric anisotropy (Nn liquid crystal). In the pixel structure of this example, both the liquid crystal molecules having positive dielectric anisotropy and negative dielectric anisotropy.

In FIG. 16, a gate insulating film GI is formed between the pixel electrode PX and the counter electrodes CT1 and CT2 as similar to the other examples, and an electric field in the horizontal direction rotating the liquid crystal molecule is formed between the electrodes.

A gate signal line GL and a drain signal line DL are the same as in the other examples. An amorphous semiconductor layer ASI is arranged between an electrode SD2 formed from the drain signal line DL as overlapping the gate signal line and an electrode SDl connected to the pixel electrode for applying a storage voltage, so as to function as a thin film transistor TFT.

A protective film PSV is formed on the thin film transistor TFT. The protective film PSV is provided mainly for protecting the thin film transistor from moisture, and a film having high transparency and high moisture resistance is used.

The protective film PSV is formed, for example, with a silicon oxide film or a silicon nitride film formed by using a plasma CVD apparatus, or in alternative, with an acrylic resin or polyimide, to have a film thickness of about from 0.1 µ to 3 µ.

A counter voltage signal line CL is formed by the same production step as the gate electrode, the scanning signal line GL and the counter electrode CT, and is constituted as capable of electrically connecting with the counter electrode CT. A counter voltage Vcom is supplied from an external circuit to the counter electrode CT via the counter voltage signal line CL.

The part crossing the image signal line DL is narrowed to decrease the probability of shorting with the image signal line DL, and may be formed in a bifurcated form, whereby they can be separated by laser trimming even when they form a short circuit.

An electrode ST is formed with a metallic film (a layer containing metallic atoms) and is connected to the pixel electrode PX via a through hole TH1. Furthermore, it is necessary that a potential is supplied to the electrode ST from the outside, and a floating electrode exhibits no effect. Therefore, it is connected to the other electrode by opening the through hole TH1 in the protective film PSV.

In this example, the electrode ST formed as integrated with the pixel electrode PX overlaps the counter electrode CT2 via the protective film PSV.

In order to ensure the contact even when scattering occurs on production of the through hole and the electrode ST, the pixel electrode PX is provided on a base larger than the pixel electrode that is provided at a part meeting the through hole TH1 at the end of the pixel electrode to be integrated with the pixel electrode PX.

As described in the foregoing, in this example, the electrode ST electrically connected to the pixel electrode is formed on the protective film PSV. According to the configuration, a capacitance (a protective film capacitance), which is formed consequently between the pixel electrode PX and the counter electrodes CT1 and CT2 with the protective film PSV or the protective film PSV and the insulating film GI as a dielectric material, is charged through the electrode ST, and when an electrode having the same direct current potential (in the case of alternating current, the potential of the direct current component) as the electrode ST is exposed to the liquid crystal layer due to a foreign matter, no charging current flows.

Therefore, no electrochemical reaction (electrode reaction) occurs in the vicinity of the exposed electrode. That is, since the electrode ST is formed on the protective film PSV, the charging current to the protective film capacitance of the other electrode due to a defect of the protective film on the electrode is suppressed, so as to suppress formation of spot type brightness difference area.

Particularly, in the invention, the gate electrode GT or the scanning signal line is defined as an electrode or a line on the cathode side. Furthermore, an electrode or a line having a higher potential than the gate electrode GT or the scanning signal line GL are defined as an electrode or a line on the anode side, and the electrode or the line on the anode side includes the source electrode SD1, the drain electrode SD2, the image signal line DL, the pixel electrode PX, the counter electrodes CT1 and CT2, and the counter voltage signal line CL.

As described in the foregoing, in the invention, while the electrode ST is electrically connected to the pixel electrode as an example of the electrode or the line on the anode side, the electrode ST may be connected to an electrode or a line comprising one or both the cathode and the anode.

FIGS. 17A, 17B, 18A, 18B, 19A and 19B are plane views showing modified examples of the pixel described in FIG. 16. In FIGS. 17A, 17B, 18A, 18B, 19A and 19B, the pixel electrode PX and the counter electrode CT each is formed with a transparent electrode (ITO or IZO), and the number of the electrodes, the electrode interval and the layer, in which the electrode is formed, are changed.

In FIGS. 17A, 17B, 18A, 18B, 19A and 19B, the electrodes of the respective groups of electrodes have a zigzag form having plural crooked parts in the running direction thereof. One side on the crooked part has an angle θ with respect to the direction of the image signal line DL, whereas the other side of the crooked part has an angle 180°-θ.

According to the configuration, the two regions (domains) having reorientation states that are different from each other in direction are formed, and thus they compensates by each other inversion of coloring and gradation in oblique directions, whereby a wide viewing angle can be obtained.

Figures 17A, 17B:
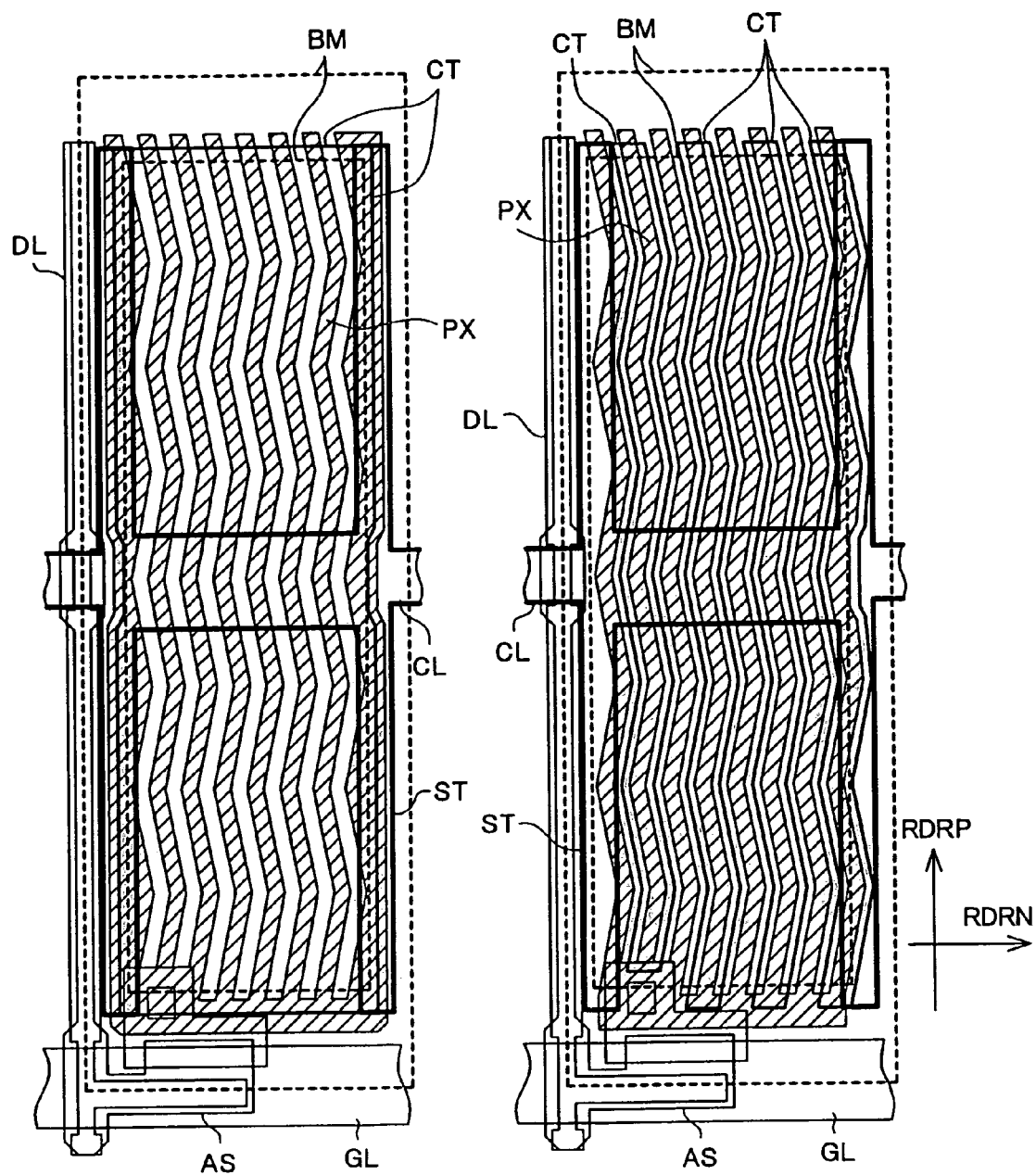
FIGS. 17A and 17B are plane views showing one pixel of further examples of a liquid crystal display part of an active matrix color liquid crystal display device.

In FIGS. 17A and 17B, it is constituted in such a manner that the direction of the electric field between the pixel electrode and the counter electrode is directed to the direction crossing the image signal line DL. FIG. 17A shows the case where the pixel electrode PX comprises six pieces, and the counter electrode CT is formed in a solid form on the whole pixel region.

In FIG. 17A, the electrode ST is connected to the counter electrode and is extended outward to the boundary of the black matrix BM (shown by the outer dotted line in FIG. 17A) and inward to the inner dotted line.

FIG. 17B shows the case where the pixel electrode PX comprises six pieces, and the counter electrode CT overlaps alternately the pixel electrode and has a width that is larger than the pixel electrode. In comparison to the case of FIG. 17A, the capacitance of the storage capacitance can be made as small as 400 fF.

Figure 18A:
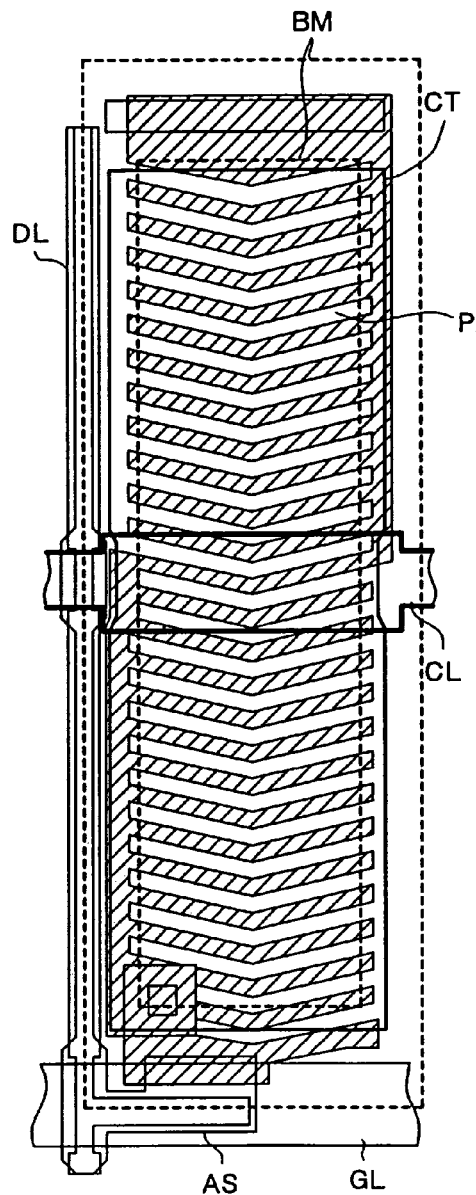
FIGS. 18A and 18B are plane views showing one pixel of further examples of a liquid crystal display part of an active matrix color liquid crystal display device.
Figure 18B:
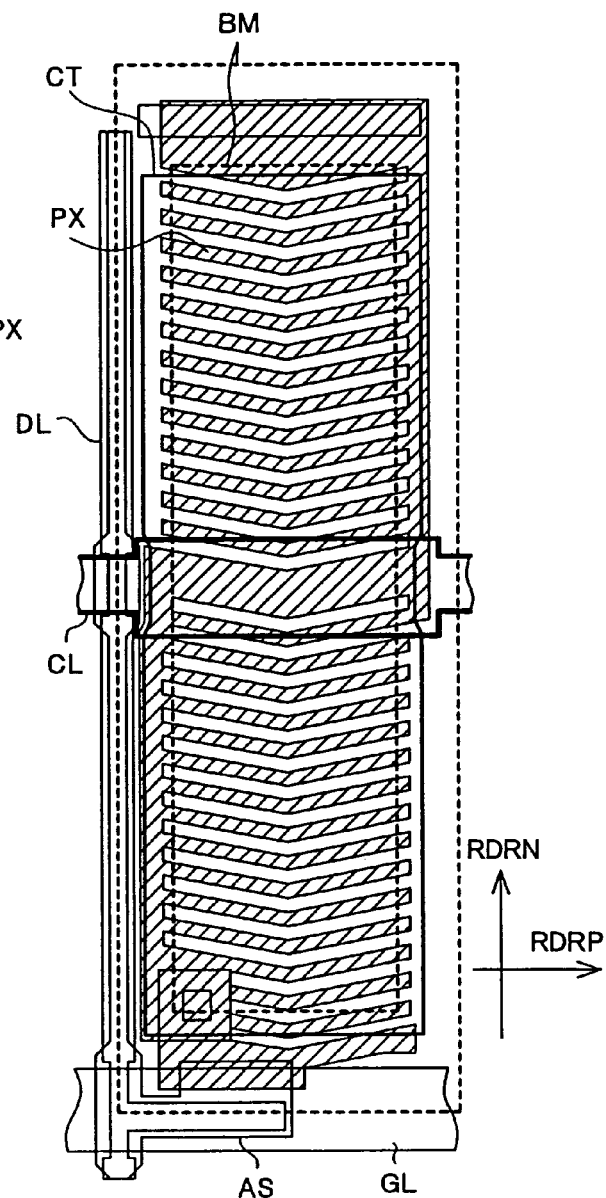

In FIGS. 18A, 18B, 19A and 19B, it is constituted in such a manner that the direction of the electric field between the pixel electrode and the counter electrode is directed to the direction along the image signal line DL. In FIGS. 18A and 18B, the counter electrode CT is formed on the substantially whole pixel region. The electrode width, the number of the electrodes and the electrode interval are changed between FIG. 18A and FIG. 18B.

Specifically, the width of the pixel electrode PX is 5 μ in FIG. 18A, whereas the width of the pixel electrode in FIG. 18B is 9 μ. The number of the pixel electrode in one pixel is 30 in FIG. 18A.

The electrode interval is 5 μ in FIG. 18A, whereas it is 4 μ in FIG. 18B. In FIG. 18B, the transmittance is improved in comparison to FIG. 18A. FIGS. 18A, 18B, 19A and 19B contain an s-shape where the end of the pixel electrode is inverted up and down inside one pixel. This is because the auxiliary capacitance between the pixel electrode and the counter electrode is made uniform in the direction of the scanning signal line GL.

FIG. 19A shows the case where the pixel electrode PX has a width of the pixel electrode of 5 μ and an interval to the adjacent pixel electrode PX of 5 μ, and the counter electrode CT overlaps alternately the pixel electrode and has a width that is larger than the pixel electrode PX.

In FIG. 19B, the pixel electrode PX has a width of 4 μ and an interval to the adjacent pixel electrode PX of 4 μ. The opening ratio in FIG. 19B is improved in comparison to FIG. 19A. The constitution of the pixel in FIGS. 19A and 19B can reduce the auxiliary capacitance in comparison to the constitution of the pixel in FIGS. 18A and 18B.

It is understood from the foregoing examples that an active matrix liquid crystal display device causing less after image can be provided.

As described in the foregoing, according to the invention, such an active matrix liquid crystal display device can be provided in that when a liquid crystal driving voltage wave having a direct current voltage overlaid is applied to a liquid crystal layer, a direct current voltage remaining in the liquid crystal layer after removing the applied direct current voltage is removed to suppress an after image.

What is claimed is:

1. An active matrix type liquid crystal display device comprising:
    a pair of substrates with liquid crystal layer there between;
    a plurality of common voltage signal lines and a plurality of drain signal lines which crossing each other formed on one of the pair of substrates;
    a semiconductor layer formed above a forming layer of the common voltage signal lines and under a forming layer of the drain signal lines;
    a pixel electrode formed in each pixel region on the one of the pair of substrates and electrically connected to one of the drain signal lines;
    wherein the semiconductor layer has parallel edges and slant edges with respect to said one of the drain signal lines, and edges of the pixel electrode facing toward neighboring edges of the semiconductor layer in a crossing region where said one of the drain signal lines crossing with one of the common voltage signal lines are shaped substantially conforming with the neighboring edges of the semiconductor layer to minimize change of distance between the semiconductor layer and the pixel electrode.

2. An active matrix type liquid crystal display device according to claim 1, wherein the semiconductor layer has two slant portions defined between two pairs of said slant edges to be narrower gradually when extending away from the crossing region where said one of the drain signal lines crossing with said one of the common voltage signal lines.

3. An active matrix type liquid crystal display device according to claim 2, wherein the edges of the pixel electrode next to the semiconductor layer is parallel to the neighboring edges of the semiconductor layer.

4. An active matrix type liquid crystal display device according to claim 3, wherein said one of the common voltage signal lines is narrower in the crossing region with said one of the drain signal lines than in a region overlapping with the pixel electrode.

5. An active matrix type liquid crystal display device according to claim 4, further comprising a counter electrode connected to said one of the common voltage signal lines, wherein the pixel electrode overlaps the counter electrode with an insulating layer sandwiched therebetween.

6. An active matrix type liquid crystal display device according to claim 5, wherein the pixel electrode has at least two forming regions, which define a non forming region therebetween, between every two neighboring drain signal lines of the drain signal lines in the direction perpendicular to the drain signal lines.

7. An active matrix type liquid crystal display device according to claim 6, wherein the counter electrode is formed in both the forming regions and the non forming region of the pixel electrode.

8. An active matrix type liquid crystal display device according to claim 7, wherein the counter electrode and the pixel electrode are made of a transparent conducting material.

9. An active matrix type liquid crystal display device according to claim 2, wherein said one of the common voltage signal lines is narrower in the crossing region with said one of the drain signal lines than in a region overlapping with the pixel electrode.

10. An active matrix type liquid crystal display device according to claim 9, further comprising a counter electrode connected to said one of the common voltage signal lines, wherein the pixel electrode overlaps the counter electrode with an insulating layer sandwiched therebetween.

11. An active matrix type liquid crystal display device according to claim 10, wherein the pixel electrode has at least two forming regions, which define a non forming region therebetween, between every two neighboring drain signal lines of the drain signal lines in the direction perpendicular to the drain signal lines.

12. An active matrix type liquid crystal display device according to claim 11, wherein the counter electrode is formed in both the forming regions and the non forming region of the pixel electrode.

13. An active matrix type liquid crystal display device according to claim 12, wherein the counter electrode and the pixel electrode are made of a transparent conducting material.

* * * * *